US012694484B2

(12) United States Patent
Ravi et al.

(10) Patent No.: US 12,694,484 B2
(45) Date of Patent: Jul. 28, 2026

(54) SEMANTIC MIXING AND STYLE TRANSFER UTILIZING A COMPOSABLE DIFFUSION NEURAL NETWORK

(71) Applicant: Adobe Inc., San Jose, CA (US)

(72) Inventors: Hareesh Ravi, San Jose, CA (US); Sachin Kelkar, Santa Clara, CA (US); Ajinkya Gorakhnath Kale, San Jose, CA (US)

(73) Assignee: Adobe Inc., San Jose, CA (US)

( * ) Notice: Subject to any disclaimer, the term of this patent is extended or adjusted under 35 U.S.C. 154(b) by 336 days.

(21) Appl. No.: 18/470,240

(22) Filed: Sep. 19, 2023

(65) Prior Publication Data

US 2025/0095114 A1      Mar. 20, 2025

(51) Int. Cl.
   G06T 5/00          (2024.01)
   G06T 5/50          (2006.01)
   G06T 5/70          (2024.01)
(52) U.S. Cl.
   CPC ................. G06T 5/70 (2024.01); G06T 5/50 (2013.01); G06T 2207/20084 (2013.01); G06T 2207/20092 (2013.01); G06T 2207/20221 (2013.01)
(58) Field of Classification Search
   CPC ... G06T 5/70; G06T 5/50; G06T 2207/20084; G06T 2207/20092; G06T 2207/20221; G06T 2207/20081; G06T 5/60
   See application file for complete search history.

(56) References Cited

U.S. PATENT DOCUMENTS

2013/0342577 A1* 12/2013 Wang ..................... A61B 6/461
                                                           345/634

OTHER PUBLICATIONS

Bahjat et al., "Imagic: Text-Based Real Image Editing with Diffusion Models", Pub. Oct. 17, 2022 (Year: 2022).*
Bram et al., "EDICT: Exact Diffusion Inversion via Coupled Transformations", Pub. Nov. 22, 2022. (Year: 2022).*
Bahjat et al., "Text-Based Real Image Editing with Diffusion Models", pub. Oct. 17, 2022, 2022.*
Bram et al.,, "EDICT: Exact Diffusion Inversion via Coupled Transformations", pub. Nov. 22, 2022. 2022.*

(Continued)

*Primary Examiner* — Mekonen T Bekele
(74) *Attorney, Agent, or Firm* — Keller Preece PLLC

(57) ABSTRACT

The present disclosure relates to systems, non-transitory computer-readable media, and methods for generating digital images by conditioning a diffusion neural network with input prompts. In particular, in one or more embodiments, the disclosed systems generate, utilizing a reverse diffusion model, an image noise representation from a first image prompt. Additionally, in some embodiments, the disclosed systems generate, utilizing a diffusion neural network conditioned with a first vector representation of the first image prompt, a first denoised image representation from the image noise representation. Moreover, in some embodiments, the disclosed systems generate, utilizing the diffusion neural network conditioned with a second vector representation of a second image prompt, a second denoised image representation from the image noise representation. Furthermore, in some embodiments, the disclosed systems combine the first denoised image representation and the second denoised image representation to generate a digital image.

20 Claims, 11 Drawing Sheets

(56)                    References Cited

OTHER PUBLICATIONS

Bahjat Kawar, Shiran Zada, Oran Lang, Omer Tov, Huiwen Chang, Tali Dekel, Inbar Mosseri, and Michal Irani, in Imagic: Text-Based Real Image Editing with Diffusion Models. Conference on Computer Vision and Pattern Recognition (CVPR) 2023. At https://arxiv.org/abs/2210.09276. pp. 1-16 , Oct. 17, 2022.

Bram Wallace, Akash Gokul, and Nikhil Naik, in EDICT: Exact Diffusion Inversion via Coupled Transformations. IEEE/CVF Conference on Computer Vision and Pattern Recognition (CVPR), 2022. At https://arxiv.org/abs/2211.12446. pp. 22532-22541, Nov. 22, 2022.

Chenlin Meng, Yutong He, Yang Song, Jiaming Song, Jiajun Wu, Jun-Yan Zhu, and Stefano Ermon, in SDEdit: Guided Image Synthesis and Editing with Stochastic Differential Equations. International Conference on Learning Representations. At https://arxiv.org/abs/2108.01073. pp. 1-33, Aug. 2, 2021.

Konpat Preechakul, Nattanat Chatthee, Suttisak Wizadwongsa, and Supasorn Suwajanakorn, in Diffusion Autoencoders: Toward a Meaningful and Decodable Representation. At https://diff-ae.github.io/. Proceedings of the IEEE/CVF Conference on Computer Vision and Pattern Recognition (CVPR), 2022, pp. 10619-10629. Nov. 30, 2021.

Nan Liu, Shuang Li, Yilun Du, Antonio Torralba, and Joshua B. Tenenbaum, in Compositional Visual Generation with Composable Diffusion Models. Computer Vision—ECCV 2022: 17th European Conference, Tel Aviv, Israel, Oct. 23-27, 2022, Proceedings, Part XVII. At https://arxiv.org/abs/2206.01714. pp. 423-439, Jun. 3, 2022.

Narek Tumanyan, Michal Geyer, Shai Bagon, and Tali Dekel, in Plug-and-Play Diffusion Features for Text-Driven Image-to-Image Translation. Proceedings of the IEEE/CVF Conference on Computer Vision and Pattern Recognition (CVPR) 2023. At https://arxiv.org/abs/2211.12572. pp. 1921-1930, Nov. 22, 2022.

Wonwoong Cho, Hareesh Ravi, Midhun Harikumar, Vinh Khuc, Krishna Kumar Singh, Jingwan Lu, David I. Inouye, and Ajinkya Kale, in Towards Enhanced Controllability of Diffusion Models. At https://arxiv.org/abs/2302.14368. pp. 1-28, Feb. 28, 2023.

* cited by examiner

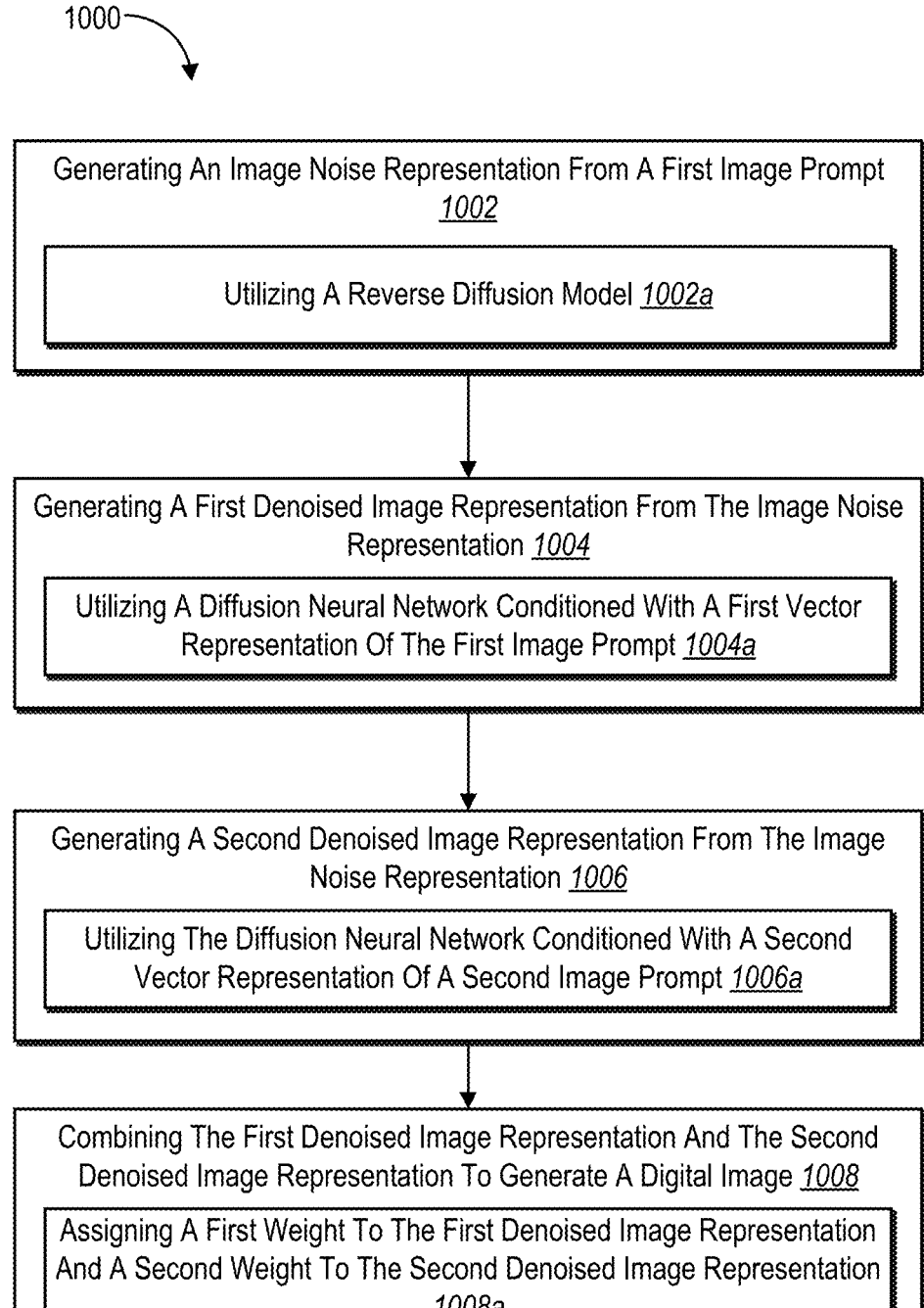

1000

Generating An Image Noise Representation From A First Image Prompt *1002*

Utilizing A Reverse Diffusion Model *1002a*

Generating A First Denoised Image Representation From The Image Noise Representation *1004*

Utilizing A Diffusion Neural Network Conditioned With A First Vector Representation Of The First Image Prompt *1004a*

Generating A Second Denoised Image Representation From The Image Noise Representation *1006*

Utilizing The Diffusion Neural Network Conditioned With A Second Vector Representation Of A Second Image Prompt *1006a*

Combining The First Denoised Image Representation And The Second Denoised Image Representation To Generate A Digital Image *1008*

Assigning A First Weight To The First Denoised Image Representation And A Second Weight To The Second Denoised Image Representation *1008a*

*Fig. 10*

SEMANTIC MIXING AND STYLE TRANSFER UTILIZING A COMPOSABLE DIFFUSION NEURAL NETWORK

BACKGROUND

Recent developments in hardware and software platforms have led to innovations in systems and methods for digital image generation. For example, existing systems can utilize various generative machine learning models to create digital images according to different prompts or inputs. Thus, for example, some existing systems can utilize diffusion neural networks to generate a digital image from a text input. Despite these advances, however, many existing systems continue to demonstrate a number of deficiencies or drawbacks, particularly with regard to accuracy and flexibility of implementing computing devices.

BRIEF SUMMARY

Embodiments of the present disclosure provide benefits and/or solve one or more problems in the art with systems, non-transitory computer-readable media, and methods for semantic mixing and style transfer in generating digital images utilizing a composable diffusion neural network. In particular, in some embodiments, the disclosed systems obtain a plurality of input prompts (e.g., a structure image and a style image) and generate a noise representation of one of the input prompts (e.g., the structure image). Additionally, in some embodiments, the disclosed systems process the noise representation through a composable diffusion neural network. In one or more implementations, the composable diffusion neural network comprises branches (or repeated layers) that generate individual denoised image representations from the input noise representation, where each branch is conditioned individually on a separate input prompt. Moreover, in one or more implementations, the disclosed systems compose these individual denoised image representations (e.g., utilizing dynamic combination weights that can be vary at different stages) for utilization in a subsequent stage of the denoising neural network. In this manner, the disclosed systems can semantically mix multiple input prompts (e.g., multiple input images), transfer a particular style from an input prompt to a resulting digital image, while also emphasizing the structure of a particular input prompt converted to an input noise representation for processing by the composable diffusion neural network.

The following description sets forth additional features and advantages of one or more embodiments of the disclosed methods, non-transitory computer-readable media, and systems. In some cases, such features and advantages are evident to a skilled artisan having the benefit of this disclosure, or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

FIG. 10 illustrates a flowchart of a series of acts for conditioning a diffusion neural network and generating a digital image in accordance with one or more embodiments.

DETAILED DESCRIPTION

Figure 1:
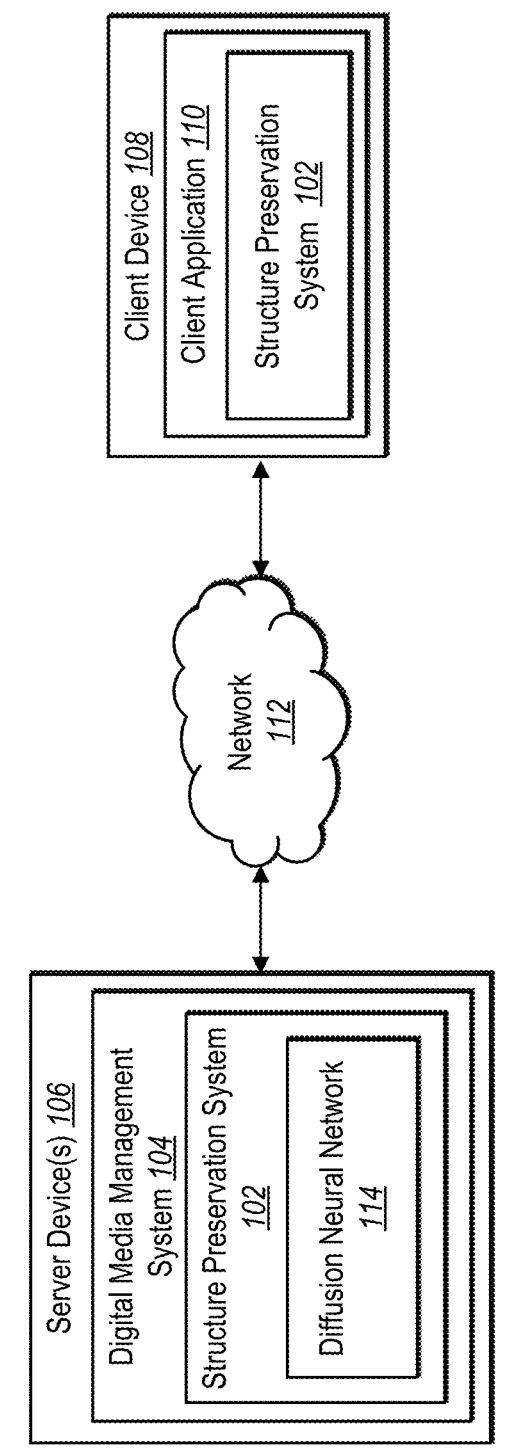
FIG. 1 illustrates a diagram of an environment in which a structure preservation system operates in accordance with one or more embodiments.

This disclosure describes one or more embodiments of a structure preservation system that generates digital images through semantic mixing and style transfer of multiple input prompts for generating digital images utilizing a composable diffusion neural network. To illustrate, the structure preservation system generates a digital image based on a first prompt (e.g., a first image) and a second prompt (e.g., a second image) utilizing a composable diffusion neural network. For example, the structure preservation system generates a noise representation of the first prompt (e.g., to preserve the structure of the first image). Additionally, the structure preservation system processes the noise representation through two branches of the diffusion neural network. In particular, the structure preservation system conditions each of these branches of the diffusion neural network with a different vector representation of the two input prompts, thus generating two denoised image representations. The structure preservation system combines the denoised image representations (utilizing dynamic weights that can change at different iterations of the diffusion neural network) and utilizes this combined representation in subsequent iterations of the diffusion neural network to generate a digital image. By utilizing an input noise representation generated from a first prompt with a composable diffusion neural network architecture, in one or more implementations the structure preservation system more accurately preserves structures from the content prompt while mixing semantics and transferring style across multiple inputs in generating a digital image.

To illustrate, in some embodiments, the structure preservation system receives a first prompt (e.g., a content prompt, or structure prompt) and utilizes a reverse diffusion model to generate a noise representation of the first prompt. By adding noise to the first prompt, in some implementations, the structure preservation system converts the first prompt to a format that can be utilized as an input to a diffusion neural network that encodes a general structure (e.g., shape, overall content, etc.) of the first prompt.

In addition, in some embodiments, the structure preservation system embeds the first prompt and the second prompt into vector representations. For instance, the structure preservation system utilizes an embedding model to generate vector representations that contain feature information of the input prompts. Then, the structure preservation system utilizes the vector representations to condition the diffusion neural network while processing the noise representation of the first prompt. For example, the structure preservation system generates two denoised image representations: a first denoised image representation by processing the noise representation of the first prompt through the diffusion neural network while conditioning the diffusion neural network with the vector representation of the first prompt; and a second denoised image representation by processing the noise representation of the first prompt through the diffusion neural network while conditioning the diffusion neural network with the vector representation of the second prompt.

With the denoised image representations, in some implementations, the structure preservation system generates a combined denoised image representation by combining the denoised image representations (e.g., utilizing a weighted average). Thus, the structure preservation system generates a combined denoised image representation of the first and second prompts.

In some implementations, the structure preservation system repeats the generation process of the denoised image representations over numerous denoising iterations. For example, in a subsequent iteration, the structure preservation system generates two additional denoised image representations: a third denoised image representation by processing the combined denoised image representation (from the previous iteration) through the diffusion neural network while conditioning the diffusion neural network with the vector representation of the first prompt; and a fourth denoised image representation by processing the combined denoised image representation (from the previous iteration) through the diffusion neural network while conditioning the diffusion neural network with the vector representation of the second prompt.

Similarly, in some embodiments, the structure preservation system composites a combined denoised image representation by combining the third and fourth denoised image representations. The structure preservation system iteratively repeats this process (e.g., for a predetermined number of iterations). On the final iteration, the structure preservation system composites a digital image.

Moreover, in one or more implementations, the structure preservation system also provides an option to control the dynamic weights utilized to composite the input prompts (e.g., to combine the denoised image representations). In some implementations, the structure preservation system provides a user interface with a weight control element for selecting weights to apply at one or more iterations of the denoising neural network. In one or more embodiments, the structure preservation system can define dynamic weights according to a function that changes across iterations of the denoising neural network.

Existing digital image generation systems suffer from a number of technical deficiencies, including inaccuracy and inflexibility of implementing computing devices. In particular, existing systems often inaccurately generate digital images according to a design intent underlying input prompts. To illustrate, existing systems can receive text prompts indicating the desired contents of a digital image, but often generate resulting digital images that fail to accurately reflect the content and style indicated within the text prompts. Moreover, existing systems often generate resulting digital images that omit or ignore portions of the input text prompts.

Existing systems also struggle with operational inflexibility. For example, existing systems often process prompt information in its entirety, without giving a user device operational control over which prompts or portions of a prompt to receive attention at various stages of a neural network. This approach can lead existing systems to generate a digital image that does not capture a design intent for the digital image. Moreover, some existing systems inflexibly limit the types and combinations of prompts. For example, many existing systems do not permit two image prompts as contributing sources of a design intent for image generation.

The structure preservation system provides a variety of technical advantages relative to existing systems. For example, by processing a noise representation of a content prompt through a diffusion neural network, the structure preservation system preserves the structure of the content prompt, thereby enhancing the relevance of a generated digital image with respect to the input prompts. In this way, the structure preservation system improves accuracy of image generation relative to existing systems. Furthermore, by generating multiple intermediate denoised image representations from multiple input prompts, the structure preservation system more effectively attends to content and style information contained within the input prompts.

In addition, the structure preservation system offers increased flexibility of operation over existing systems. For instance, by allowing a user to give two (or more) input prompts and identify one prompt as a content prompt and another prompt as a style prompt, the structure preservation system offers enhanced controllability for generating novel digital images. Moreover, by allowing a user to schedule weights for combining denoised image representations, the structure preservation system provides for controllable style transfer in image composition. For example, the structure preservation system permits a client device to select a function of weights that controls when the style prompt and the content prompt are given the most attention (e.g., at various stages of the denoising process). In this way, the structure preservation system offers a user increased control over the resulting structure and style of a generated digital image.

Additional detail will now be provided in relation to illustrative figures portraying example embodiments and implementations of a structure preservation system. For example, FIG. 1 illustrates a system 100 (or environment) in which a structure preservation system 102 operates in accordance with one or more embodiments. As illustrated, the system 100 includes server device(s) 106, a network 112, and a client device 108. As further illustrated, the server device(s) 106 and the client device 108 communicate with one another via the network 112.

As shown in FIG. 1, the server device(s) 106 includes a digital media management system 104 that further includes the structure preservation system 102. In some embodiments, the structure preservation system 102 generates a digital image in response to text prompts, image prompts, or a combination of text and image prompts. In some embodiments, the structure preservation system 102 utilizes a machine learning model (such as a diffusion neural network 114) to generate the digital image. In some embodiments, the structure preservation system 102 conditions the diffusion neural network 114 as described herein. In some embodiments, the server device(s) 106 includes, but is not limited to, a computing device (such as explained below with reference to FIG. 11).

In some instances, the structure preservation system 102 receives a request (e.g., from the client device 108) to generate a digital image. For example, the structure preservation system 102 receives two image prompts (or a text prompt and an image prompt, or two text prompts, or some other number and/or combination of input prompts) and generates a digital image in response to the two image prompts. Some embodiments of server device(s) 106 perform a variety of functions via the digital media management system 104 on the server device(s) 106. To illustrate, the server device(s) 106 (through the structure preservation system 102 on the digital media management system 104) performs functions such as, but not limited to, obtaining image prompts, obtaining text prompts, generating an image noise representation of a prompt (e.g., of an image prompt or of a text prompt), generating vector representations of the image prompts and/or the text prompts, conditioning a diffusion neural network with a vector representation, generating denoised image representations from the image noise representation utilizing the diffusion neural network, and generating a digital image. In some embodiments, the server device(s) 106 utilizes the diffusion neural network 114 to generate the digital image. In some embodiments, the server device(s) 106 trains the diffusion neural network 114.

Furthermore, as shown in FIG. 1, the system 100 includes the client device 108. In some embodiments, the client device 108 includes, but is not limited to, a mobile device (e.g., a smartphone, a tablet), a laptop computer, a desktop computer, or any other type of computing device, including those explained below with reference to FIG. 11. Some embodiments of client device 108 perform a variety of functions via a client application 110 on client device 108. For example, the client device 108 (through the client application 110) performs functions such as, but not limited to, obtaining image prompts, obtaining text prompts, generating an image noise representation of a prompt (e.g., of an image prompt or of a text prompt), generating vector representations of the image prompts and/or the text prompts, conditioning a diffusion neural network with a vector representation, generating denoised image representations from the image noise representation utilizing the diffusion neural network, and generating a digital image. In some embodiments, the client device 108 utilizes the diffusion neural network 114 to generate the digital image. In some embodiments, the client device 108 trains the diffusion neural network 114.

To access the functionalities of the structure preservation system 102 (as described above and in greater detail below), in one or more embodiments, a user interacts with the client application 110 on the client device 108. For example, the client application 110 includes one or more software applications (e.g., to interact with digital images and/or text in accordance with one or more embodiments described herein) installed on the client device 108, such as a digital media management application, an image editing application, and/or an image retrieval application. In certain instances, the client application 110 is hosted on the server device(s) 106. Additionally, when hosted on the server device(s) 106, the client application 110 is accessed by the client device 108 through a web browser and/or another online interfacing platform and/or tool.

As illustrated in FIG. 1, in some embodiments, the structure preservation system 102 is hosted by the client application 110 on the client device 108 (e.g., additionally or alternatively to being hosted by the digital media management system 104 on the server device(s) 106). For example, the structure preservation system 102 performs the neural network conditioning and image generation techniques described herein on the client device 108. In some implementations, the structure preservation system 102 utilizes the server device(s) 106 to train and implement machine learning models (such as the diffusion neural network 114). In one or more embodiments, the structure preservation system 102 utilizes the server device(s) 106 to train machine learning models (such as the diffusion neural network 114) and utilizes the client device 108 to implement or apply the machine learning models.

Further, although FIG. 1 illustrates the structure preservation system 102 being implemented by a particular component and/or device within the system 100 (e.g., the server device(s) 106 and/or the client device 108), in some embodiments the structure preservation system 102 is implemented, in whole or in part, by other computing devices and/or components in the system 100. For instance, in some embodiments, the structure preservation system 102 is implemented on another client device. More specifically, in one or more embodiments, the description of (and acts performed by) the structure preservation system 102 are implemented by (or performed by) the client application 110 on another client device.

In some embodiments, the client application 110 includes a web hosting application that allows the client device 108 to interact with content and services hosted on the server device(s) 106. To illustrate, in one or more implementations, the client device 108 accesses a web page or computing application supported by the server device(s) 106. The client device 108 provides input to the server device(s) 106 (e.g., a text prompt, an image prompt, etc.). In response, the structure preservation system 102 on the server device(s) 106 performs operations described herein to condition a neural network (e.g., the diffusion neural network 114) and utilize the neural network to generate a digital image. The server device(s) 106 provides the output or results of the operations (e.g., the digital image) to the client device 108. As another example, in some implementations, the structure preservation system 102 on the client device 108 performs operations described herein to condition a neural network (e.g., the diffusion neural network 114) and utilize the neural network to generate a digital image. The client device 108 provides the output or results of the operations (e.g., the digital image) via a display of the client device 108, and/or transmits the output or results of the operations to another device (e.g., the server device(s) 106 and/or another client device).

Additionally, as shown in FIG. 1, the system 100 includes the network 112. As mentioned above, in some instances, the network 112 enables communication between components of the system 100. In certain embodiments, the network 112 includes a suitable network and may communicate using any communication platforms and technologies suitable for transporting data and/or communication signals, examples of which are described with reference to FIG. 11. Furthermore, although FIG. 1 illustrates the server device(s) 106 and the client device 108 communicating via the network 112, in certain embodiments, the various components of the system 100 communicate and/or interact via other methods (e.g., the server device(s) 106 and the client device 108 communicate directly).

As mentioned, in some embodiments, the structure preservation system 102 generates digital images from input prompts by conditioning and utilizing a neural network. For instance, FIG. 2 illustrates the structure preservation system 102 generating a digital image from a first prompt and a second prompt utilizing a diffusion neural network in accordance with one or more embodiments.

Figure 2:
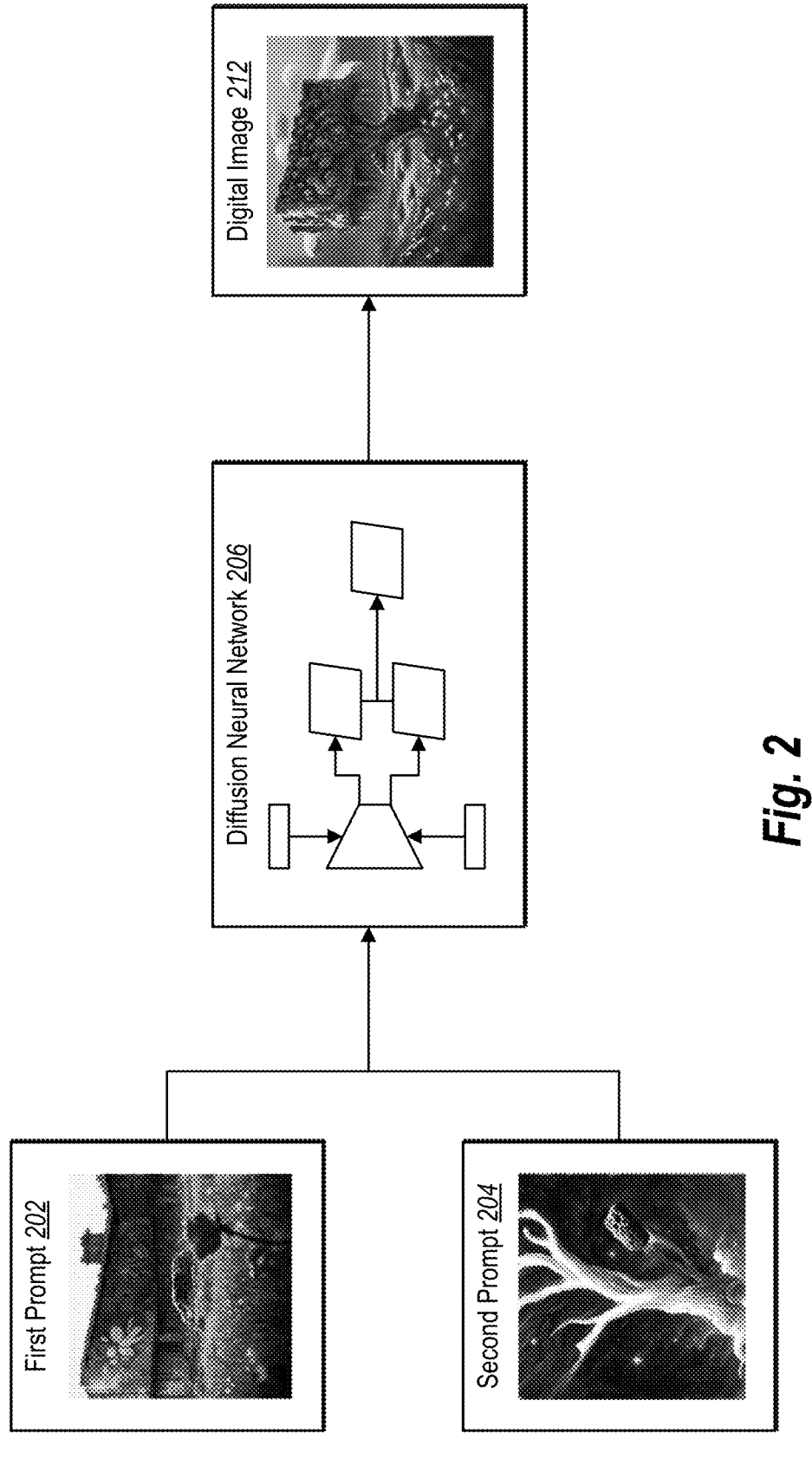
FIG. 2 illustrates the structure preservation system generating a digital image from a first prompt and a second prompt utilizing a diffusion neural network in accordance with one or more embodiments.

Specifically, FIG. 2 shows the structure preservation system 102 obtaining a first prompt 202 and a second prompt 204. For example, in some embodiments, the structure preservation system 102 receives an image prompt for the first prompt 202 and another image prompt for the second prompt 204. An image prompt includes a digital visual representation (e.g., having a meaning or intent for generating or modifying a digital image). An image prompt can portray a variety of objects or subjects in a variety of formats. For example, an image prompt can include a jpeg, a tiff, a pdf, or some other digital visual media format. Similarly, an image prompt can include a frame of a digital video. The structure preservation system 102 can obtain an image prompt from a variety of sources. For example, in some embodiments the structure preservation system 102 captures an image prompt utilizing a camera device of a client device. In some implementations, the structure preservation system 102 obtains an image prompt from a repository of digital images (e.g., from a cloud storage repository).

Additionally, in some implementations, the structure preservation system 102 obtains a text prompt for the first prompt 202 and/or obtains another text prompt for the second prompt 204. A text prompt includes a verbal description (e.g., of a characteristic, feature, or intended modification for a digital image). For example, a text prompt can include a textual description of a desired characteristic of an output digital image (e.g., an object to portray in a digital image or a style to be reflected in the digital image). The structure preservation system 102 can identify a text prompt from a variety of different sources. For example, in some implementations, the structure preservation system 102 receives a text prompt based on user interaction (e.g., typing) with a user interface of a client device. In some embodiments, the structure preservation system 102 obtains a text prompt from audio input via a client device. For example, the structure preservation system 102 converts audio input (e.g., speaking) to a textual input utilizing a transcription model.

In some embodiments, as discussed in further detail below, the structure preservation system 102 converts a text prompt into an image prompt. For example, the structure preservation system 102 utilizes a generative model to generate an input image representation from a text prompt. Thus, in some embodiments, the structure preservation system 102 obtains image prompts for inputs to a diffusion neural network, whether the image prompts be direct user inputs or converted from one or more text prompts.

Additionally, FIG. 2 shows the structure preservation system 102 utilizing a diffusion neural network 206 to generate a digital image 212 from the first prompt 202 and the second prompt 204. In some embodiments, the diffusion neural network 206 is the same as or similar to the diffusion neural network 114 described above. As described with additional detail in connection with FIGS. 3 and 4, in some embodiments, the structure preservation system 102 utilizes the diffusion neural network 206 to generate a plurality (e.g., one for each prompt) of denoised image representations by conditioning the diffusion neural network 206 with vector representations of the respective first and second prompts. In addition, in some embodiments, the structure preservation system 102 combines the plurality of denoised image representations to generate a combined denoised image representation. Moreover, in some implementations, the structure preservation system 102 repeats this process through numerous (e.g., 1000) denoising iterations to generate the digital image 212.

A neural network includes a machine learning model that is trainable and/or tunable based on inputs to determine classifications and/or scores, or to approximate unknown functions. For example, in some cases, a neural network includes a model of interconnected artificial neurons (e.g., organized in layers) that communicate and learn to approximate complex functions and generate outputs based on inputs provided to the neural network. In some cases, a neural network refers to an algorithm (or set of algorithms) that implements deep learning techniques to model high-level abstractions in data. For example, a neural network includes a deep neural network, a convolutional neural network, a diffusion neural network, a recurrent neural network (e.g., an LSTM), a graph neural network, a transformer, or a generative adversarial neural network.

A diffusion neural network (or diffusional model) refers to a likelihood-based model for image synthesis. In particular, a diffusion model is based on a Gaussian denoising process (e.g., based on a premise that the noises added to the original images are drawn from Gaussian distributions). The denoising process involves predicting the added noises using a neural network (e.g., a convolutional neural network such as UNet). For example, in some implementations, the structure preservation system 102 utilizes a composable diffusion model, as described by Nan Liu, Shuang Li, Yilun Du, Antonio Torralba, and Joshua B. Tenenbaum in *Compositional Visual Generation with Composable Diffusion Models*, ECCV 2022, which is incorporated by reference herein in its entirety. During training, Gaussian noise is iteratively added to a digital image in a sequence of steps (or iterations) to generate a noise map (or noise representation). The neural network is trained to recreate the digital image by reversing the noising process. In particular, the diffusion neural network utilizes a plurality of steps (or iterations) to iteratively denoise the noise representation. The diffusion neural network can thus generate digital images from noise representations.

In some implementations, the structure preservation system 102 conditions the diffusion neural network 206 with a vector representation of an input prompt to generate a denoised image representation from an image noise representation. For example, the structure preservation system 102 generates an image noise representation from the first prompt 202 and inputs the image noise representation to the diffusion neural network 206. From the image noise representation, the structure preservation system 102 generates a first denoised image representation and a second denoised image representation. In particular, the structure preservation system 102 generates the first denoised image representation by conditioning the diffusion neural network 206 with a first vector representation of the first prompt 202, and generates the second denoised image representation by conditioning the diffusion neural network 206 with a second vector representation of the second prompt 204.

To illustrate, the structure preservation system 102 utilizes a conditioning mechanism to condition the diffusion neural network 206 for adding edits or modifications in generating a digital image from a noise representation. In conditional settings, diffusion models/neural networks can be augmented with classifier or non-classifier guidance. Diffusion models/neural networks can be conditioned on texts, images, or both. Moreover, diffusion models/neural networks include latent diffusion models. Latent diffusion models are diffusion models that utilize latent representations (e.g., rather than pixels). For example, a latent diffusion model includes a diffusion model trained and sampled from a latent space (e.g., trained by noising and denoising encodings or embeddings in a latent space rather than noising and denoising pixels). The structure preservation system 102 can utilize a variety of diffusion models. For example, in one or more embodiments, the structure preservation system 102 utilizes a diffusion model (or diffusion neural network) as described by Robin Rombach, Andreas Blattmann, Dominik Lorenz, Patrick Esser, and Bjorn Ommer in *High-resolution image synthesis with latent diffusion models*, in Proceedings of the IEEE/CVF Conference on Computer Vision and Pattern Recognition, pages 10684-10695, 2022. Similarly, in some implementations, the structure preservation system 102 utilizes a diffusion neural network as described by Jiaming Song, et al. in Denoising diffusion implicit models, in ICLR, 2021.

As mentioned, in some embodiments, the structure preservation system 102 generates denoised image representations within a denoising iteration of a neural network. For instance, FIG. 3 illustrates the structure preservation system 102 conditioning a diffusion neural network and generating a combined denoised image representation in a denoising iteration of the diffusion neural network in accordance with one or more embodiments.

Figure 3:
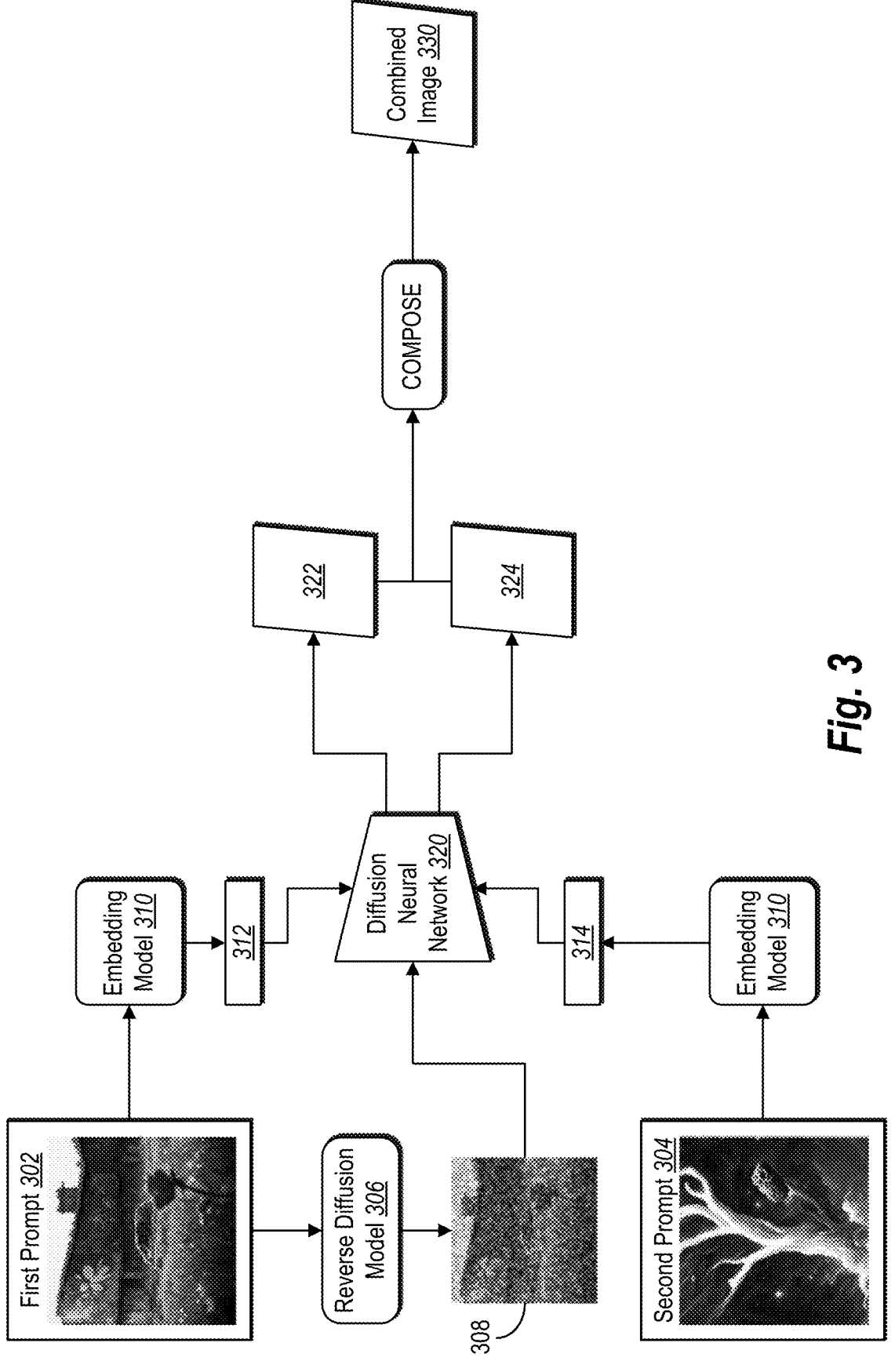
FIG. 3 illustrates the structure preservation system conditioning a diffusion neural network and generating a combined denoised image representation in a denoising iteration of the diffusion neural network in accordance with one or more embodiments.

Specifically, FIG. 3 shows the structure preservation system 102 obtaining a first prompt 302 and a second prompt 304. As discussed previously, in some embodiments, the first prompt 302 is a first image prompt, while in other embodiments, the first prompt 302 is a first text prompt. Likewise, in one or more embodiments, the second prompt 304 is a second image prompt, while in some embodiments, the second prompt 304 is a second text prompt. Any combination of prompt types is contemplated by this disclosure. For instance, in some embodiments, one of the prompts is an image prompt and another of the prompts is a text prompt. In some embodiments, the structure preservation system 102 converts a text prompt into an image prompt, as explained below.

As mentioned above, in some embodiments, the structure preservation system 102 utilizes a reverse diffusion model 306 to generate an image noise representation 308 from the first prompt 302. An image noise representation (or noise representation) includes a representation of an image prompt with added noise. A reverse diffusion model includes a machine learning model that adds noise to an image to prepare the image for a diffusion process by a diffusion neural network. For instance, a reverse diffusion model generates an image noise representation of a digital image in a noise space. Reverse diffusion models include stochastic reverse diffusion models and deterministic reverse diffusion models. Thus, in some embodiments, the structure preservation system 102 generates the image noise representation 308 of the first prompt 302 utilizing a deterministic reverse diffusion model or a stochastic reverse diffusion model.

To illustrate, in one or more embodiments, the structure preservation system 102 utilizes a stochastic reverse diffusion model as described by Chenlin Meng, Yutong He, Yang Song, Jiaming Song, Jiajun Wu, Jun-Yan Zhu, and Stefano Ermon in *SDEdit: Guided Image Synthesis and Editing with Stochastic Differential Equations*, at arXiv:2108.01073, 2022, which is incorporated by reference in its entirety herein. As another example, in one or more embodiments, the structure preservation system 102 utilizes a deterministic reverse diffusion model as described by Konpat Preechakul, Nattanat Chatthee, Suttisak Wizadwongsa, and Supasorn Suwajanakorn in *Diffusion Autoencoders: Toward a Meaningful and Decodable Representation*, in CVPR 2022, which is incorporated by reference in its entirety herein.

As also shown in FIG. 3, in some embodiments, the structure preservation system 102 utilizes an embedding model 310 to generate vector representations of the input prompts. In particular, the structure preservation system 102 utilizes the embedding model 310 (e.g., a CLIP embedding model or another embedding model) to generate a first vector representation 312 from the first prompt 302 and a second vector representation 314 from the second prompt 304. A vector representation includes a numerical representation of features of an image, a text string, or a combination of an image and a text string. For example, an image vector representation includes a feature map, feature vector, or other numerical representation of latent features of a digital image. To illustrate, in some embodiments, the structure preservation system 102 generates an image vector representation by processing an image prompt through one or more layers of the embedding model 310. Thus, in some implementations, when the structure preservation system 102 obtains two image prompts, the structure preservation system 102 generates the first vector representation 312 of the first prompt 302 by generating a first image vector representation of a first image prompt, and generates the second vector representation 314 of the second prompt 304 by generating a second image vector representation of a second image prompt.

As further illustrated in FIG. 3, in some implementations, the structure preservation system 102 utilizes a diffusion neural network 320 to generate denoised image representations. In some embodiments, the diffusion neural network 320 is the same as or similar to the diffusion neural network 114 or the diffusion neural network 206 described above. In particular, the structure preservation system 102 utilizes the diffusion neural network 320 to generate a first denoised image representation 322 from the image noise representation 308. Additionally, the structure preservation system 102 utilizes the diffusion neural network 320 to generate a second denoised image representation 324 from the image noise representation 308. A denoised image representation includes an image that has undergone at least one denoising iteration of a diffusion neural network. For example, the structure preservation system 102 generates a denoised image representation by processing an image noise representation (or a denoised image representation from a previous denoising iteration) through the diffusion neural network to replace at least some of the noise in the image noise representation (or in the previous iteration's denoised image representation) with pixel representations that reverse the noising process (e.g., by predicting the added noises from the reverse diffusion model 306). Thus, in some embodiments, a denoised image representation includes an image representation that has at least partially had noise replaced with pixel representations. It will be understood that the diffusion neural network can operate in pixel space and/or in a latent space (e.g., of a latent diffusion neural network). For instance, in some implementations, the diffusion neural network uses an encoder (as an initial operation) so that noise representations and denoised image representations comprise representations in a latent space (rather than direct pixel values). Moreover, the diffusion neural network utilizes a decoder (as a final operation) to convert from the latent space to the pixel space to generate a digital image. Moreover, in some embodiments, a denoised image representation includes a generated digital image at an intermediate stage or at a final stage of a denoising process.

As mentioned, in some implementations, the structure preservation system 102 conditions the diffusion neural network 320 utilizing the vector representations of the input prompts. For example, the structure preservation system 102 conditions the diffusion neural network 320 with the first vector representation 312 to generate the first denoised image representation 322. More particularly, in some implementations, the structure preservation system 102 generates, utilizing the diffusion neural network 320 conditioned with the first vector representation 312 of the first prompt 302, the first denoised image representation 322 from the image noise representation 308. Likewise, in some implementations, the structure preservation system 102 generates, utilizing the diffusion neural network 320 conditioned with the second vector representation 314 of the second prompt 304, the second denoised image representation 324 from the image noise representation 308.

Furthermore, in some embodiments, the structure preservation system 102 composes the first and second denoised image representations. For example, the structure preservation system 102 combines the first denoised image representation 322 and the second denoised image representation 324 to generate a combined denoised image representation 330 of the first prompt 302 and the second prompt 304. A combined denoised image representation includes a composite image representation from a plurality of denoised image representations. For example, in some implementations, a combined denoised image representation includes a denoised image representation generated from a weighted average of two denoised image representations.

To illustrate, in some embodiments, the structure preservation system 102 combines the first denoised image representation 322 and the second denoised image representation 324 by assigning a first weight to the first denoised image representation 322 and a second weight to the second denoised image representation 324. Then, the structure preservation system 102 combines the first denoised image representation 322 and the second denoised image representation 324 according to the first weight and the second weight (e.g., utilizing a weighted average).

Figure 4:
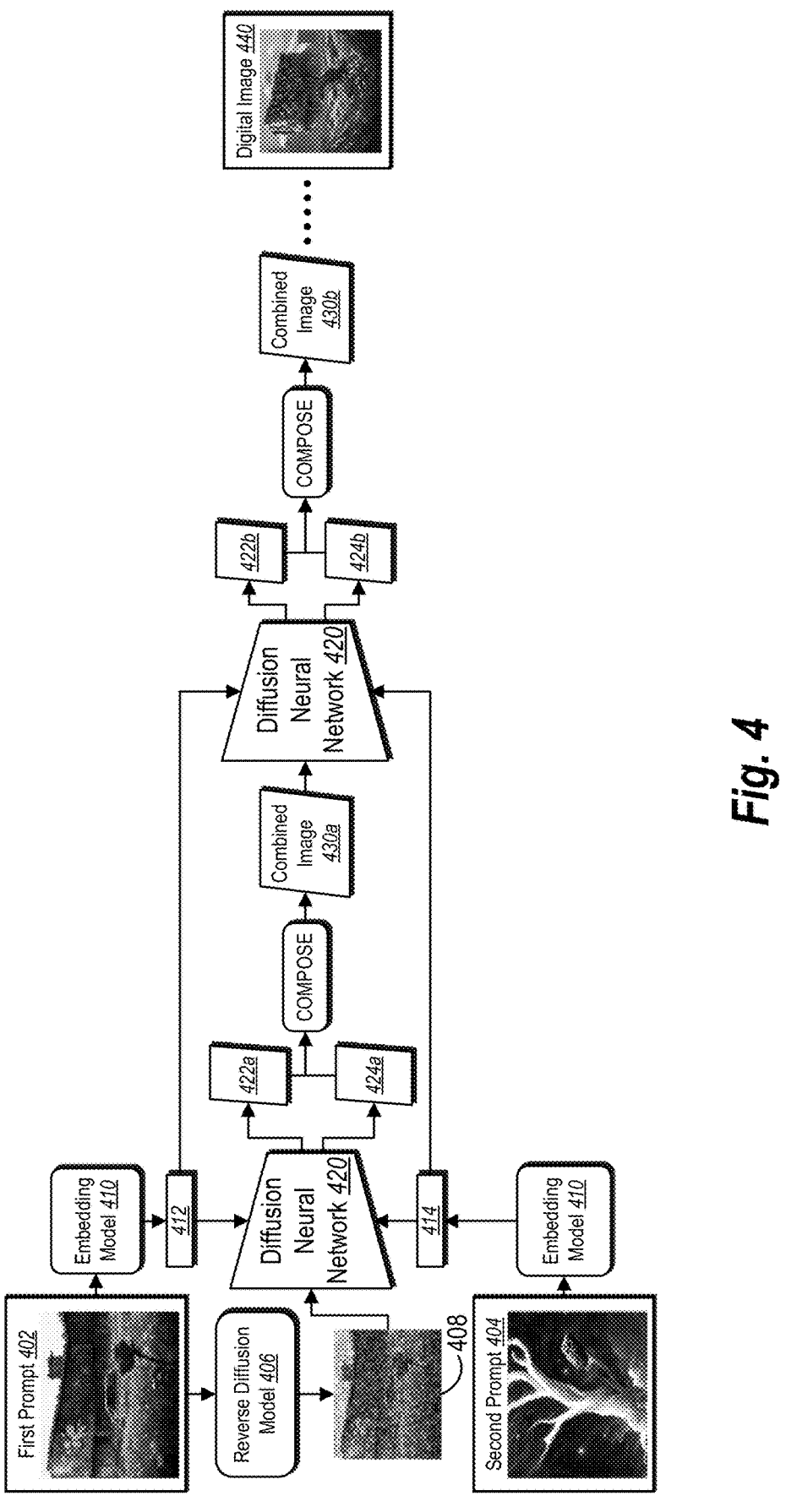
FIG. 4 illustrates the structure preservation system conditioning a diffusion neural network and generating a digital image utilizing a plurality of denoising iterations of the diffusion neural network in accordance with one or more embodiments.

As mentioned above, in some embodiments, the structure preservation system 102 performs multiple denoising iterations of a diffusion neural network to generate a digital image. For instance, FIG. 4 illustrates the structure preservation system 102 conditioning a diffusion neural network and generating a digital image utilizing a plurality of denoising iterations of the diffusion neural network in accordance with one or more embodiments. FIG. 4 resembles FIG. 3 in certain respects, in that FIG. 3 shows the structure preservation system 102 utilizing the diffusion neural network 320 in a single denoising iteration, while FIG. 4 shows the structure preservation system 102 utilizing a diffusion neural network 420 (e.g., similar to or the same as diffusion neural network 320) in a plurality of denoising iterations. Thus, the description above in connection with FIG. 3, of some components of the structure preservation system 102 applies equally to similar components of the structure preservation system 102 shown in FIG. 4.

In particular, FIG. 4 shows the structure preservation system 102 obtaining a first prompt 402 and a second prompt 404. Furthermore, the structure preservation system 102 utilizes a reverse diffusion model 406 (e.g., similar to or the same as reverse diffusion model 306) to generate an image noise representation 408. Moreover, the structure preservation system 102 utilizes an embedding model 410 (e.g., similar to or the same as embedding model 310) to generate a first vector representation 412 from the first prompt 402, and a second vector representation 414 from the second prompt 404.

Additionally, as shown in FIG. 4, the structure preservation system 102 conditions the diffusion neural network 420 with the first vector representation 412 to generate, from the image noise representation 408, a first denoised image representation 422a. Furthermore, the structure preservation system 102 conditions the diffusion neural network 420 with the second vector representation 414 to generate, from the image noise representation 408, a second denoised image representation 424a. Stated differently, the structure preservation system 102 generates, from the noise representation 408 of the first prompt 402 and utilizing a first denoising iteration of the diffusion neural network 420, the first denoised image representation 422a conditioned with the first vector representation 412 and the second denoised image representation 424a conditioned with a second vector representation 414.

Moreover, in some embodiments, the structure preservation system 102 generates a combined denoised image representation 430a from the first denoised image representation 422a and the second denoised image representation 424a. For example, the structure preservation system 102 combines the first denoised image representation 422a and the second denoised image representation 424a, at a first denoising iteration of the diffusion neural network 420, to generate the combined denoised image representation 430a. As mentioned, in some cases, the combined denoised image representation 430a is an image representation of the first prompt 402 and the second prompt 404.

As mentioned, in some implementations, the structure preservation system 102 performs multiple denoising iterations of the diffusion neural network 420. To illustrate, in a subsequent (e.g., second) denoising iteration, the structure preservation system 102 conditions the diffusion neural network 420 with the first vector representation 412 to generate, from the combined denoised image representation 430a, a third denoised image representation 422b. Likewise, the structure preservation system 102 conditions the diffusion neural network 420 with the second vector representation 414 to generate, from the combined denoised image representation 430a, a fourth denoised image representation 424b.

Moreover, in some implementations, the structure preservation system 102 combines the third denoised image representation 422b and the fourth denoised image representation 424b to generate an additional combined denoised image representation 430b of the first prompt 402 and the second prompt 404. For example, the structure preservation system 102 combines, at a second denoising iteration of the diffusion neural network 420, the third denoised image representation 422b and the fourth denoised image representation 424b to generate the additional combined denoised image representation 430b. In some cases, the structure preservation system 102 assigns a third weight to the third denoised image representation 422b and a fourth weight to the fourth denoised image representation 424b (e.g., to combine the third denoised image representation 422b and the fourth denoised image representation 424b according to the third weight and the fourth weight). In some implementations, the third weight is different from the first weight, and the fourth weight is different from the second weight.

To further illustrate the denoising process, in some embodiments, the structure preservation system 102 utilizes subsequent denoising iterations of the diffusion neural network 420 to generate additional denoised image representations from previous combined denoised image representations. For example, the structure preservation system 102 utilizes a second denoising iteration of the diffusion neural network 420 to generate the third and fourth denoised image representations 422b, 424b conditioned with the first and second vector representations 412, 414, respectively. Furthermore, the structure preservation system 102 utilizes a third denoising iteration of the diffusion neural network 420 to generate a fifth denoised image representation and a sixth denoised image representation conditioned, respectively, with the first vector representation 412 and the second vector representation 414.

In some implementations, the structure preservation system 102 repeats this process numerous times (e.g., over one thousand denoising iterations). As mentioned, the structure preservation system 102 utilizes the diffusion neural network 420 to generate a digital image 440. For example, at a final denoising iteration of the diffusion neural network 420, the structure preservation system 102 combines the most recent denoised image representations into the digital image 440. Stated differently, on the ultimate denoising iteration, the structure preservation system 102 generates a final combined denoised image representation (e.g., as in previous iterations), and the final combined denoised image representation is the digital image 440. In this way, in some implementations, the structure preservation system 102 combines the first denoised image representation 422a and the second denoised image representation 424a to generate the digital image 440. Stated in another way, the structure preservation system 102 combines the third denoised image representation 422b and the fourth denoised image representation 424b to generate the digital image 440.

As mentioned above, in some embodiments, the structure preservation system 102 assigns weights to the denoised image representations for composing the combined denoised image representation. For instance, FIG. 5 illustrates the structure preservation system 102 generating digital images from input prompts according to various weight settings in accordance with one or more embodiments.

Figure 5:
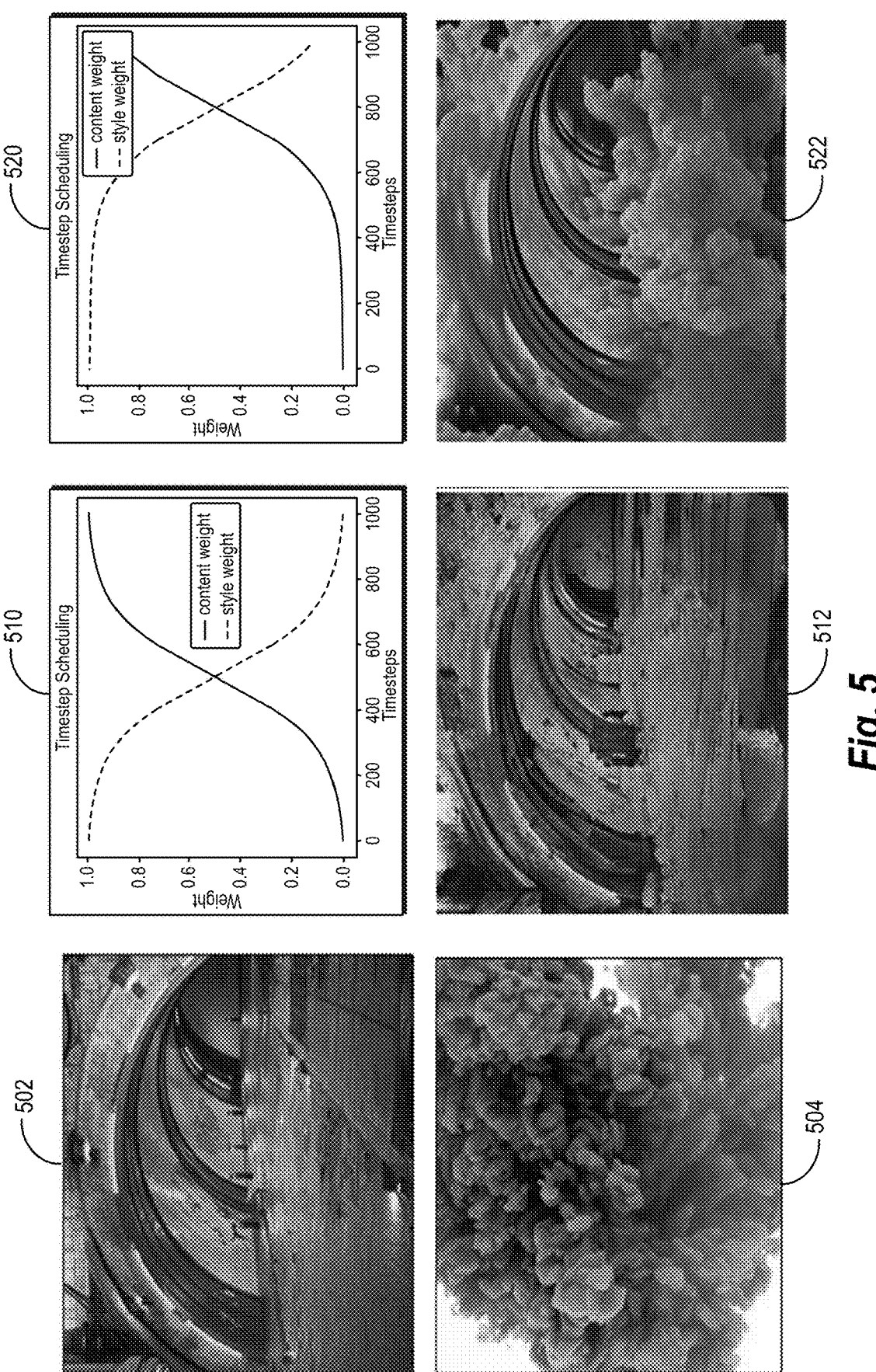
FIG. 5 illustrates the structure preservation system generating digital images from input prompts according to various weight settings in accordance with one or more embodiments.

Specifically, FIG. 5 shows the structure preservation system 102 obtaining a first image prompt 502 and a second image prompt 504. In some cases, a user may intend for one of the image prompts primarily to represent content for a desired output digital image, and may intend for the other image prompt primarily to evoke style for the desired output digital image. In some embodiments, the structure preservation system 102 receives an indication of which prompt represents content and which prompt represents style. For example, the user may select a content prompt (e.g., by uploading the first image prompt 502 first, or by selecting a content selection button in association with the first image prompt 502, etc.) and a style prompt.

In some embodiments, the structure preservation system 102 determines a function of weights defining a plurality of weights for combining denoised image representations across a plurality of denoising iterations of the diffusion neural network. To illustrate, at any particular denoising iteration, the structure preservation system 102 assigns weights to the denoised image representations based on the function of weights. For example, in the first denoising iteration, the structure preservation system 102 combines the first denoised image representation and the second denoised image representation by determining the first weight and the second weight from the function of weights. Then, in the second denoising iteration, the structure preservation system 102 combines the third denoised image representation and the fourth denoised image representation by determining the third weight and the fourth weight from the function of weights.

To further illustrate, FIG. 5 shows a function of weights 510 according to one or more embodiments of the structure preservation system 102. For instance, at timestep 1000 (e.g., the first denoising iteration), the structure preservation system 102 assigns a weight of 1.0 to the content prompt (e.g., the first image prompt 502) and a weight of 0.0 to the style prompt (e.g., the second image prompt). Thus, at the first denoising iteration, the structure preservation system 102 generates the combined denoised image representation by giving full weight to the denoised image representation of the content prompt, and no weight to the denoised image representation of the style prompt. As the timesteps progress (e.g., from 1000 downward), the function of weights 510 give progressively more weight to the style prompt, and progressively less weight to the content prompt. For example, around timestep 500, the content weight and the style weight are approximately equal. Thus, in one or more embodiments, at or around denoising iteration 500, the structure preservation system 102 generates the combined denoised image representation by giving equal (or approximately equal) weight to the denoised image representation of the content prompt and the denoised image representation of the style prompt. Continuing further (e.g., toward timestep 0), the function of weights 510 approaches 1.0 for the style weight and 0.0 for the content weight. Utilizing the function of weights 510, the structure preservation system 102 generates an output digital image 512.

As an additional illustration, FIG. 5 shows a function of weights 520 according to one or more embodiments of the structure preservation system 102. Utilizing the function of weights 520, the structure preservation system 102 generates an output digital image 522. The function of weights 520 resembles the function of weights 510 in certain respects, although in the function of weights 520, the content weight and style weight cross (e.g., at 0.5) earlier on (e.g., around timestep 800). Thus, in this example, the style prompt receives more weight earlier on in the denoising process. This added prominence of the style prompt earlier and for more iterations is reflected in the digital image 522 (e.g., as compared with the digital image 512). For instance, the digital image 522, while maintaining some structure of the first image prompt 502 (which is the content prompt in this example), has increased influence of the second image prompt 504 (which is the style prompt in this example) than the digital image 512. For example, the smoke depicted in the second image prompt 504 is more prominently visible in the digital image 522 than in the digital image 512.

As mentioned, in some implementations, the structure preservation system 102 combines (e.g., at each denoising iteration of the diffusion neural network) the denoised image representations according to their respective assigned weights. For example, the structure preservation system 102 determines a weighted average of the denoised image representations to generate the combined denoised image representation. To illustrate, the structure preservation system 102 determines a first weight for the first denoised image representation and a second weight for the second denoised image representation, and then generates the combined denoised image representation from the first denoised image representation and the second denoised image representation according to the first weight and the second weight (e.g., by multiplying values of the denoised image representations with their respective weights and summing the weighted values). Then, in a subsequent denoising iteration, the structure preservation system 102 determines a third weight for the third denoised image representation and a fourth weight for the fourth denoised image representation, and combines the third denoised image representation and the fourth denoised image representation according to the third weight and the fourth weight.

In certain alternative embodiments, other functions of weights are possible. For example, in one or more embodiments, the content weight and the style weight are constant (e.g., 0.4 and 0.6, respectively) throughout the timesteps of the diffusion neural network. As another example, in one or more embodiments, the content weight linearly decreases while the style weight linearly increases (or vice versa) across the timesteps. As further examples, in some embodiments, the content weight exponentially decreases while the style weight exponentially increases (or vice versa) across the timesteps. In some embodiments, the function of weights is a step function. In some embodiments, the function of weights is a user-defined function.

In some embodiments, at any particular denoising iteration, the structure preservation system 102 compares the combined denoised image representation with the first prompt and the second prompt and adjusts the function of weights according to the comparisons. For example, the structure preservation system 102 determines a measure of similarity between the combined denoised image representation and each of the input prompts. If, for example, the measure of similarity as to the first prompt is greater than (i.e., more similar) the measure of similarity as to the second prompt, the structure preservation system 102 increases the weight for the second prompt (and correspondingly decreases the weight for the first prompt) to give more weight to the second prompt in a subsequent denoising iterations. Thus, in some embodiments, the structure preservation system 102 adaptively adjusts the weights to enhance the responsiveness (e.g., attention) of the diffusion neural network to the input prompts.

In some embodiments, the structure preservation system 102 determines weights utilizing the timestep scheduling techniques described by Wonwoong Cho, Hareesh Ravi, Midhun Harikumar, Vinh Khuc, Krishna Kumar Singh, Jingwan Lu, David I. Inouye, and Ajinkya Kale in *Towards Enhanced Controllability of Diffusion Models*, CVPR 2023, which is incorporated by reference herein in its entirety.

As mentioned above, in some embodiments, the structure preservation system 102 increases user control over style and content influences in a generated digital image. For instance, FIG. 6 illustrates example outputs of the structure preservation system 102 according to various weight settings in accordance with one or more embodiments.

Figure 6:
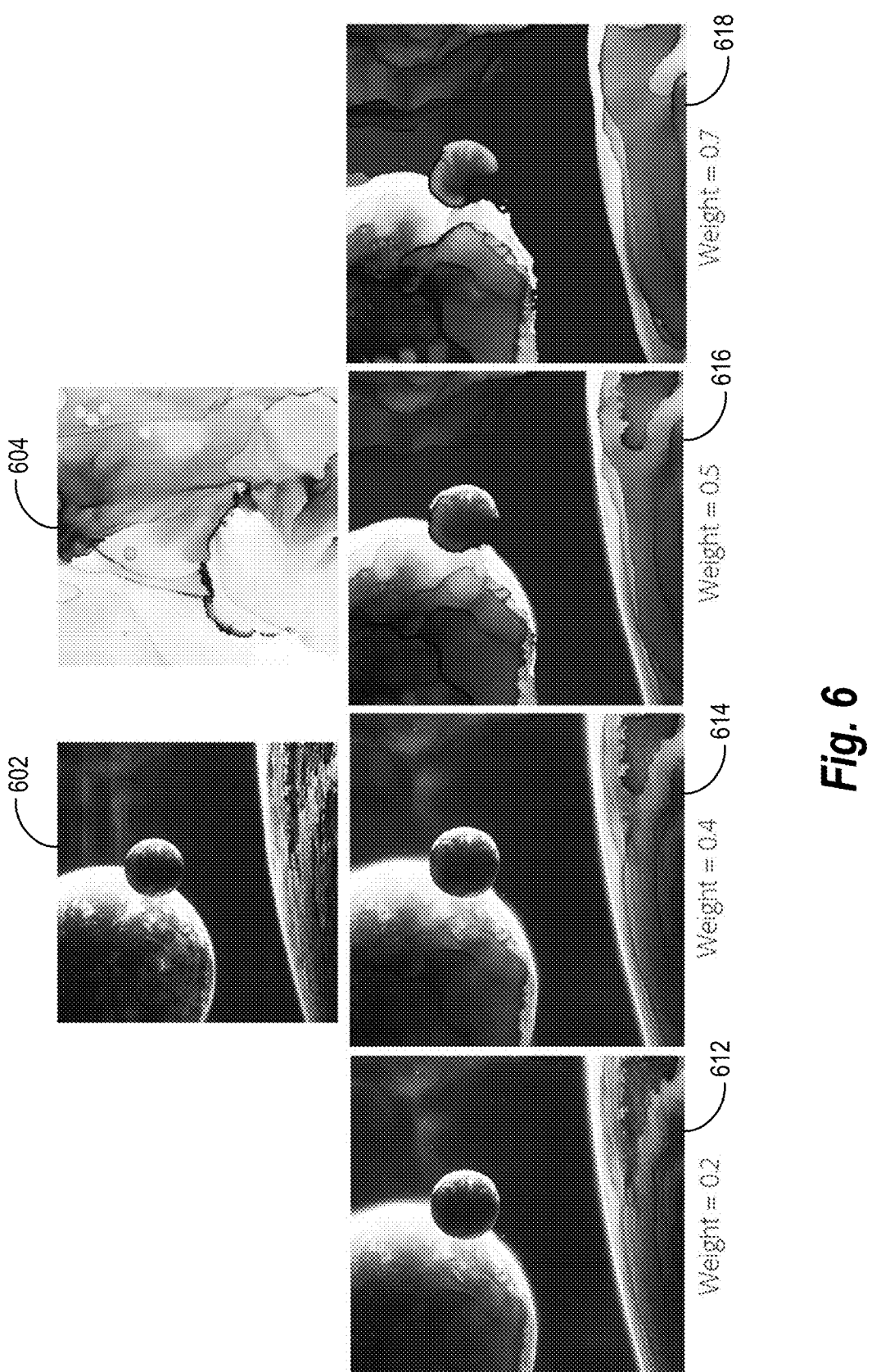
FIG. 6 illustrates example outputs of the structure preservation system according to various weight settings in accordance with one or more embodiments.

Specifically, FIG. 6 shows the structure preservation system 102 obtaining a first image prompt 602 and a second image prompt 604. In this example, the first image prompt 602 represents content for an output digital image, while the second image prompt 604 represents a style for the output digital image.

Furthermore, FIG. 6 shows example output digital images according to different weight settings for style and content influences on the outputs. In particular, the structure preservation system 102 generates an output digital image 612 with a style weight setting of 0.2, an output digital image 614 with a style weight setting of 0.4, an output digital image 616 with a style weight setting of 0.5, and an output digital image 618 with a style weight of 0.7. As reflected in the output digital images, the second image prompt 604 has increasing influence on the output digital image as the style weight increases. For example, the celestial bodies of the first image prompt 602 all appear in the output digital images 612-618, but with increasing influence of the watercolor style of the second image prompt 604 as the style weight increases. In this way, the structure preservation system 102 gives a user enhanced control over style influences on image content by scheduling weights (e.g., by magnitudes and/or changes through a function of weights) across denoising iterations of the diffusion neural network. Thus, the structure preservation system 102 can increase flexibility of implementing computing devices by providing additional functionality (e.g., increased operational control over the output digital images).

In some embodiments, the structure preservation system 102 provides multiple output digital images (e.g., based on multiple style and/or content weight settings) for display via a user interface of a client device. For example, the structure preservation system 102 provides the digital images 612-618 for display, thereby allowing a user to view output results corresponding to various weight settings.

As mentioned above, in some embodiments, the structure preservation system 102 generates a digital image that accurately reflects a semantic meaning contained within text prompts. For instance, FIG. 7 illustrates the structure preservation system 102 generating a digital image from text prompts in accordance with one or more embodiments.

Figure 7:
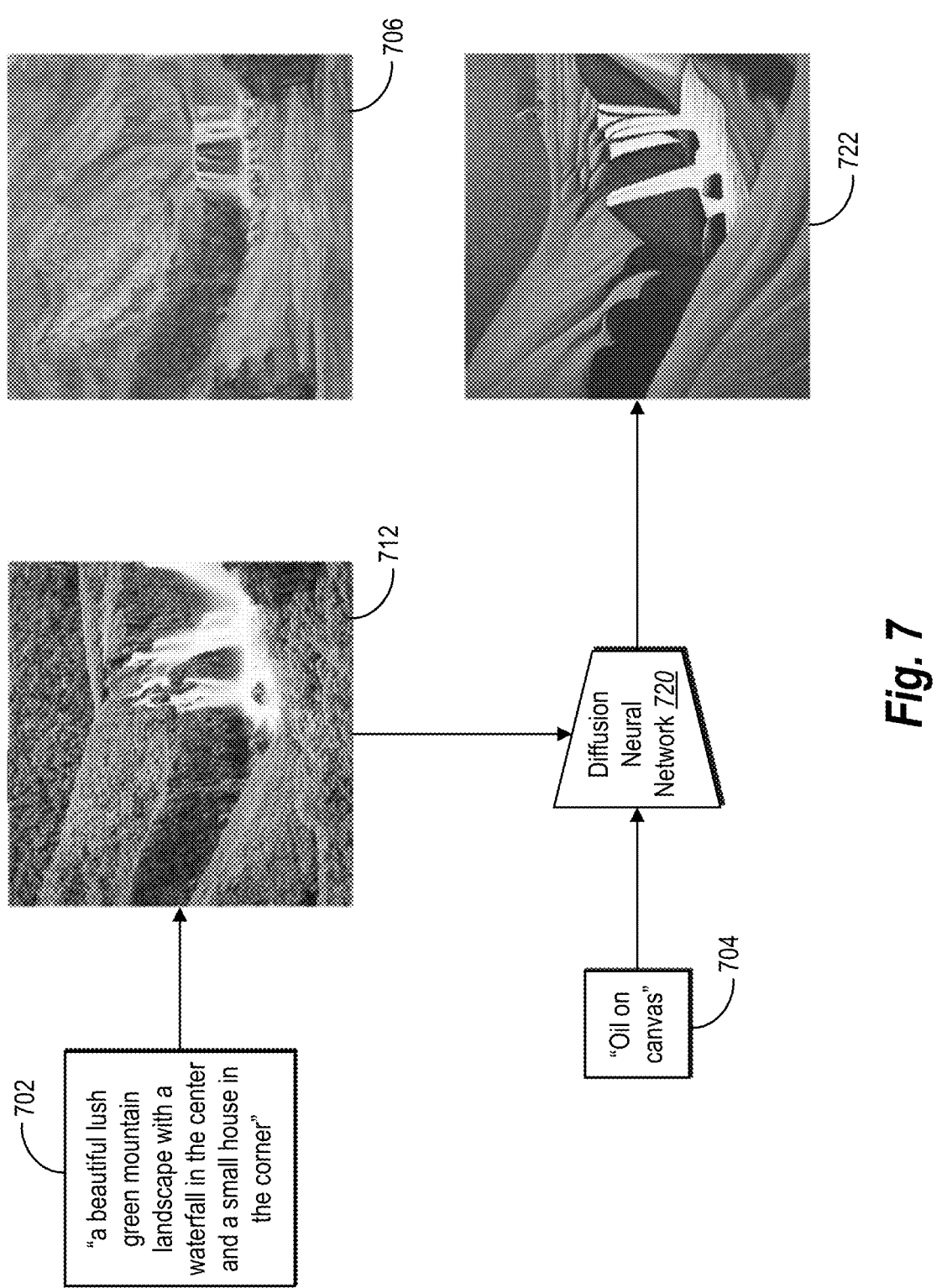
FIG. 7 illustrates the structure preservation system generating a digital image from text prompts in accordance with one or more embodiments.

Specifically, FIG. 7 shows the structure preservation system 102 obtaining a first text prompt 702 and a second text prompt 704. In some implementations, the structure preservation system 102 converts a text prompt into an image prompt. For example, the structure preservation system 102 utilizes a generative model to generate an input image representation 712 from the first text prompt 702. In some implementations, a generative model includes a machine learning model (e.g., a diffusion model) that generates a digital image from a text input. For example, in some embodiments, a generative model includes the diffusion neural networks described herein used for generating denoised image representations.

Moreover, in some embodiments, the structure preservation system 102 utilizes the input image representation 712 as an input to a diffusion neural network 720 (e.g., similar to or the same as the diffusion neural network 420). For instance, in some embodiments, the structure preservation system 102 generates an image noise representation (as described above) from the input image representation 712. Additionally, in some embodiments, the structure preservation system 102 generates a first vector representation (as described above) from the input image representation 712. Furthermore, the structure preservation system 102 utilizes the diffusion neural network 720 to generate a denoised image representation from the image noise representation conditioned with the first vector representation.

In addition, in some implementations, the structure preservation system 102 generates a second denoised image representation from the image noise representation conditioned with a second vector representation of the second text prompt 704. Then, the structure preservation system 102 combines the first vector representation and the second vector representation (e.g., as described above) to generate a combined denoised image representation and, ultimately, a digital image 722.

To illustrate the success of the structure preservation system 102, FIG. 7 also shows a digital image 706 as generated by an existing system. The digital image 722 generated by the structure preservation system 102 demonstrates superior results over the digital image 706 generated by the existing system. In particular, the first text prompt 702 asks for "a beautiful lush green mountain landscape with a waterfall in the center and a small house in the corner." Moreover, the second text prompt 704 asks for a style of "oil on canvas." While some of the elements of the first text prompt 702 appear in the existing system's output digital image 706, the digital image 706 does not include a small house in the corner. Thus, the existing system does not fulfill the semantic intent of the first text prompt 702.

By contrast, the output digital image 722 of the structure preservation system 102 does fulfill the semantic intent of the first text prompt 702. For instance, the digital image 722 includes a beautiful lush green mountain landscape, a waterfall in the center, and a small house in the corner. Moreover, the digital image 722 has an oil on canvas style, consistent with the second text prompt 704. Thus, in some implementations, the structure preservation system 102 creates digital images that accurately reflect a design intent of the input prompts.

In some implementations, the structure preservation system 102 selects between a stochastic reverse diffusion model and a deterministic reverse diffusion model. For example, in some implementations, a stochastic reverse diffusion model adds noise for a number of iterations to generate a noise representation. By adding noise for the number of iterations, in some implementations, the noise representation generated by the stochastic reverse diffusion model preserves additional structural information (e.g., the house show in the digital image 722) in the denoising process.

As mentioned above, in some embodiments, the structure preservation system 102 offers enhanced control features for generating digital images. For instance, FIG. 8 illustrates the structure preservation system 102 providing a user interface for controlling weight settings of input prompts via a weight control element in accordance with one or more embodiments.

Figure 8:
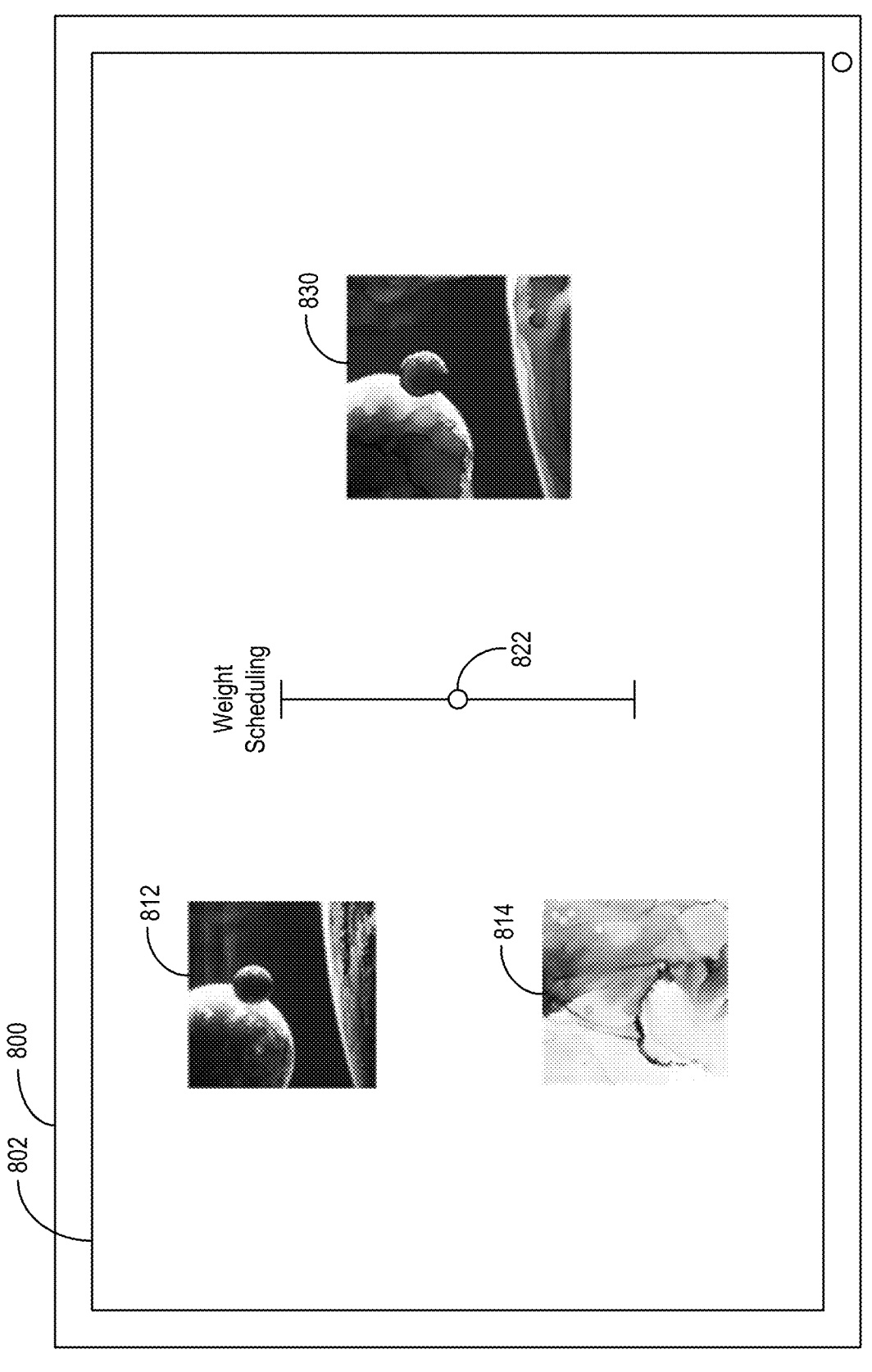
FIG. 8 illustrates the structure preservation system providing a user interface for controlling weight settings of input prompts via a weight control element in accordance with one or more embodiments.

Specifically, FIG. 8 shows a client device 800 (e.g., the client device 108) with a user interface 802. In some implementations, the structure preservation system 102 receives (e.g., as user inputs through the client device 800) a first image prompt 812 and a second image prompt 814. As discussed above, in some embodiments, the structure preservation system 102 receives an indication of which input prompt is intended as a content prompt, and which input prompt is intended as a style prompt. For example, in some implementations, the structure preservation system 102 provides a selection button for indicating which prompt is a content prompt. As another example, in some implementations, the structure preservation system 102 requests the user upload or select the content prompt first and the style prompt second.

As additionally illustrated in FIG. 8, in some embodiments, the structure preservation system 102 provides, for display via the user interface 802 of the client device 800, a weight control element 822. For example, the weight control element 822 corresponds to a weight schedule, such as one of the functions of weights described above. Moreover, in some embodiments, the structure preservation system 102 determines a first weight and a second weight for composing a combined denoised image representation (and, ultimately, a digital image 830) based on a user interaction with the weight control element 822. To illustrate, the structure preservation system 102 receives a user interaction with the weight control element 822 via the user interface 802 of the client device 800. Moreover, the structure preservation system 102 determines, based on the user interaction with the weight control element 822, a first weight for a first denoised image representation and a second weight for a second denoised image representation. Then, the structure preservation system 102 combines the first denoised image representation and the second denoised image representation according to the first weight and the second weight. Although FIG. 8 illustrates a single slider element, the structure preservation system 102 can provide a selection element that indicates a particular function or a plurality of elements for selecting different weights for different iterations.

Figure 9:
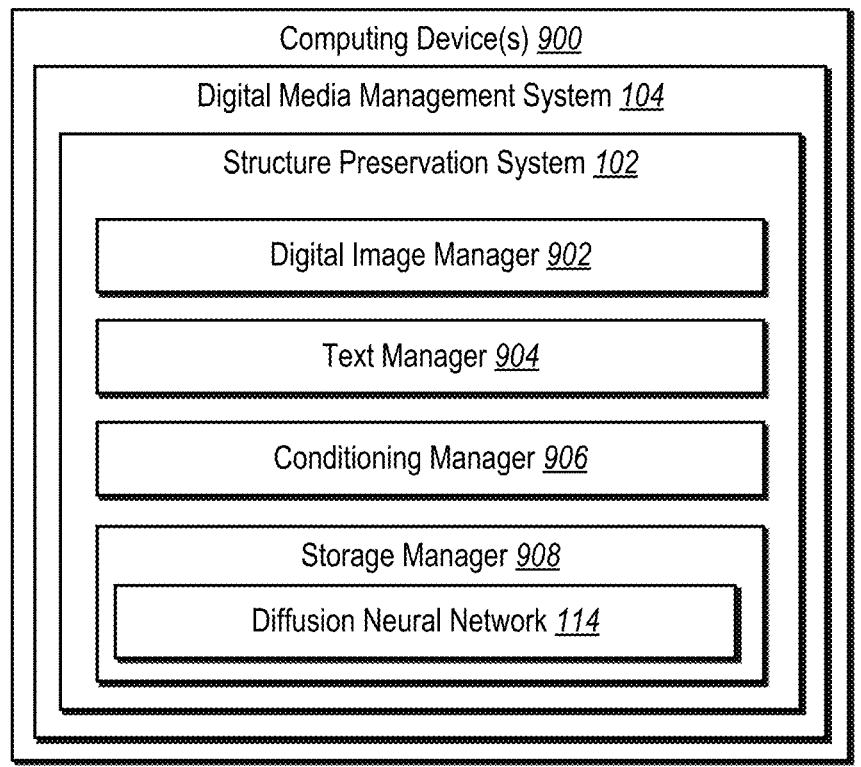
FIG. 9 illustrates a diagram of an example architecture of the structure preservation system in accordance with one or more embodiments.

Turning now to FIG. 9, additional detail will be provided regarding components and capabilities of one or more embodiments of the structure preservation system 102. In particular, FIG. 9 illustrates an example structure preservation system 102 executed by a computing device(s) 900 (e.g., the server device(s) 106 or the client device 108). As shown by the embodiment of FIG. 9, the computing device(s) 900 includes or hosts the digital media management system 104 and/or the structure preservation system 102. Furthermore, as shown in FIG. 9, the structure preservation system 102 includes a digital image manager 902, a text manager 904, a conditioning manager 906, and a storage manager 908. In addition, in some implementations, the storage manager 908 includes the diffusion neural network 114.

As shown in FIG. 9, the structure preservation system 102 includes a digital image manager 902. In some implementations, the digital image manager 902 obtains an image prompt (or a plurality of image prompts) and generates a vector representation from the image prompt. In some implementations, the digital image manager 902 utilizes a neural network (e.g., the diffusion neural network 114) to generate denoised image representations and a digital image. In addition, in some implementations, the digital image manager 902 utilizes a reverse diffusion model to generate an image noise representation from an image prompt.

In addition, as shown in FIG. 9, the structure preservation system 102 includes a text manager 904. In some implementations, the text manager 904 obtains a text prompt (or a plurality of text prompts) and generates a vector representation from the text prompt.

Moreover, as shown in FIG. 9, the structure preservation system 102 includes a conditioning manager 906. In some implementations, the conditioning manager 906 conditions a neural network (e.g., the diffusion neural network 114) with vector representations of input prompts, as described herein.

Furthermore, as shown in FIG. 9, the structure preservation system 102 includes a storage manager 908. In some implementations, the storage manager 908 stores information (e.g., via one or more memory devices) on behalf of the structure preservation system 102. For example, the storage manager 908 stores image prompts (e.g., digital images), text prompts (e.g., text strings), vector representations, image noise representations, denoised image representations, combined denoised image representations, and/or generated digital images. Additionally, in some implementations, the storage manager 908 stores parameters of one or more machine learning models, including the diffusion neural network 114.

Each of the components 902-908 of the structure preservation system 102 can include software, hardware, or both. For example, the components 902-908 can include one or more instructions stored on a computer-readable storage medium and executable by processors of one or more computing devices, such as a client device or server device. When executed by the one or more processors, the computer-executable instructions of the structure preservation system 102 can cause the computing device(s) to perform the methods described herein. Alternatively, the components 902-908 can include hardware, such as a special purpose processing device to perform a certain function or group of functions. Alternatively, the components 902-908 of the structure preservation system 102 can include a combination of computer-executable instructions and hardware.

Furthermore, the components 902-908 of the structure preservation system 102 may, for example, be implemented as one or more operating systems, as one or more standalone applications, as one or more modules of an application, as one or more plug-ins, as one or more library functions or functions that may be called by other applications, and/or as a cloud-computing model. Thus, the components 902-908 may be implemented as a stand-alone application, such as a desktop or mobile application. Furthermore, the components 902-908 may be implemented as one or more web-based applications hosted on a remote server. The components 902-908 may also be implemented in a suite of mobile device applications or "apps." To illustrate, the components 902-908 may be implemented in an application, including but not limited to Adobe After Effects, Adobe Creative Cloud, Adobe Express, Adobe Illustrator, Adobe Photoshop, and Adobe Sensei. The foregoing are either registered trademarks or trademarks of Adobe in the United States and/or other countries.

FIGS. 1-9, the corresponding text, and the examples provide a number of different methods, systems, devices, and non-transitory computer-readable media of the structure preservation system 102. In addition to the foregoing, one or more embodiments can also be described in terms of flowcharts comprising acts for accomplishing a particular result, as shown in FIG. 10. FIG. 10 may be performed with more or fewer acts. Further, the acts may be performed in differing orders. Additionally, the acts described herein may be repeated or performed in parallel with one another or parallel with different instances of the same or similar acts.

As mentioned, FIG. 10 illustrates a flowchart of a series of acts 1000 for conditioning a diffusion neural network and generating a digital image in accordance with one or more implementations. While FIG. 10 illustrates acts according to one implementation, alternative implementations may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In some implementations, a system performs the acts of FIG. 10.

As shown in FIG. 10, the series of acts 1000 includes an act 1002 of generating an image noise representation from a first image prompt, an act 1004 of generating a first denoised image representation from the image noise representation, an act 1006 of generating a second denoised image representation from the image noise representation, and an act 1008 of combining the first denoised image representation and the second denoised image representation to generate a digital image. Additionally, as shown in FIG. 10, the series of acts 1000 includes an act 1002a of utilizing a reverse diffusion model, an act 1004a of utilizing a diffusion neural network conditioned with a first vector representation of the first image prompt, an act 1006a of utilizing the diffusion neural network conditioned with a second vector representation of a second image prompt, and an act 1008a of assigning a first weight to the first denoised image representation and a second weight to the second denoised image representation.

In particular, in some implementations, the act 1002 includes generating, utilizing a reverse diffusion model, an image noise representation from a first image prompt, the act 1004 includes generating, utilizing a diffusion neural network conditioned with a first vector representation of the first image prompt, a first denoised image representation from the image noise representation, the act 1006 includes generating, utilizing the diffusion neural network conditioned with a second vector representation of a second image prompt, a second denoised image representation from the image noise representation, and the act 1008 includes combining the first denoised image representation and the second denoised image representation to generate a digital image.

Alternatively, or additionally, in some implementations, the series of acts 1000 includes generating, utilizing a reverse diffusion model, a noise representation of a first prompt; generating, utilizing an embedding model, a first vector representation of the first prompt and a second vector representation of a second prompt; generating a first denoised image representation from the noise representation of the first prompt utilizing a diffusion neural network conditioned with the first vector representation of the first prompt; generating a second denoised image representation from the noise representation of the first prompt utilizing the diffusion neural network conditioned with the second vector representation of the second prompt; and combining the first denoised image representation and the second denoised image representation to generate a digital image.

Moreover, in some implementations, the series of acts 1000 includes generating, from a noise representation of a first prompt and utilizing a first denoising iteration of a diffusion neural network, a first denoised image representation conditioned with a first vector representation and a second denoised image representation conditioned with a second vector representation; generating a combined denoised image representation from the first denoised image representation and the second denoised image representation; generating, from the combined denoised image representation and utilizing a second denoising iteration of the diffusion neural network, a third denoised image representation conditioned with the first vector representation and a fourth denoised image representation conditioned with the second vector representation; and combining the third denoised image representation and the fourth denoised image representation to generate a digital image.

To illustrate, in some implementations, the series of acts 1000 includes combining the first denoised image representation and the second denoised image representation by assigning a first weight to the first denoised image representation and a second weight to the second denoised image representation. Moreover, in one or more implementations, the series of acts 1000 includes providing, for display via a user interface of a client device, a weight control element; and determining the first weight and the second weight based on a user interaction with the weight control element. Furthermore, in one or more implementations, the series of acts 1000 includes combining the first denoised image representation and the second denoised image representation at a first denoising iteration of the diffusion neural network; and combining, at a second denoising iteration of the diffusion neural network, a third denoised image representation and a fourth denoised image representation by assigning a third weight to the third denoised image representation and a fourth weight to the fourth denoised image representation.

Additionally, in some implementations, the series of acts 1000 includes determining a function of weights defining a plurality of weights for combining denoised image representations across a plurality of denoising iterations of the diffusion neural network; and combining the first denoised image representation and the second denoised image representation by determining the first weight and the second weight from the function of weights.

In addition, in some implementations, the series of acts 1000 includes receiving a user interaction with a weight control element via a user interface of a client device; determining, based on the user interaction with the weight control element, a first weight for the first denoised image representation and a second weight for the second denoised image representation; and combining the first denoised image representation and the second denoised image representation according to the first weight and the second weight.

Moreover, in some implementations, the series of acts 1000 includes determining a first weight for the first denoised image representation and a second weight for the second denoised image representation; generating the combined denoised image representation from the first denoised image representation and the second denoised image representation according to the first weight and the second weight; determining a third weight for the third denoised image representation and a fourth weight for the fourth denoised image representation; and combining the third denoised image representation and the fourth denoised image representation according to the third weight and the fourth weight.

Furthermore, in one or more implementations, the series of acts 1000 includes determining a function of weights defining a plurality of weights for combining denoised image representations across a plurality of denoising iterations of the diffusion neural network; and combining the third denoised image representation and the fourth denoised image representation by determining a third weight and a fourth weight from the function of weights.

To further illustrate, in some implementations, the series of acts 1000 includes generating the image noise representation from the first image prompt by at least one of: generating the image noise representation utilizing a deterministic reverse diffusion model; or generating the image noise representation utilizing a stochastic reverse diffusion model. For example, in one or more implementations, the series of acts 1000 includes generating the noise representation of the first prompt utilizing a deterministic reverse diffusion model or a stochastic reverse diffusion model.

Moreover, in some implementations, the series of acts 1000 includes generating the first denoised image representation and the second denoised image representation by: generating, utilizing an embedding model, the first vector representation from the first image prompt; and generating, utilizing the embedding model, the second vector representation from the second image prompt. Furthermore, in one or more implementations, the series of acts 1000 includes generating, utilizing an embedding model, the first vector representation from a first image prompt or a first text prompt; and generating, utilizing the embedding model, the second vector representation from a second image prompt or a second text prompt.

Additionally, in some implementations, the series of acts 1000 includes combining the first denoised image representation and the second denoised image representation by generating a combined denoised image representation; generating, utilizing the diffusion neural network conditioned with the first vector representation, a third denoised image representation from the combined denoised image representation; generating, utilizing the diffusion neural network conditioned with the second vector representation, a fourth denoised image representation from the combined denoised image representation; and combining the third denoised image representation and the fourth denoised image representation by generating an additional combined denoised image representation.

Furthermore, in one or more implementations, the series of acts 1000 includes combining the first denoised image representation and the second denoised image representation by generating, for a first denoising iteration of the diffusion neural network, a combined denoised image representation of the first image prompt and the second image prompt; generating, utilizing a second denoising iteration of the diffusion neural network, a third denoised image representation from the combined denoised image representation; and generating, utilizing the second denoising iteration of the diffusion neural network, a fourth denoised image representation from the combined denoised image representation.

Moreover, in some implementations, the series of acts 1000 includes generating a third denoised image representation from a combined denoised image representation of the first prompt and the second prompt, utilizing the diffusion neural network conditioned with the first vector representation of the first prompt; generating a fourth denoised image representation from the combined denoised image representation, utilizing the diffusion neural network conditioned with the second vector representation of the second prompt; and combining the third denoised image representation and the fourth denoised image representation to generate an additional combined denoised image representation of the first prompt and the second prompt.

Furthermore, in some implementations, the series of acts 1000 includes combining the first denoised image representation and the second denoised image representation to generate a combined denoised image representation of the first prompt and the second prompt in a first denoising iteration of the diffusion neural network; generating a third denoised image representation from the combined denoised image representation utilizing a second denoising iteration of the diffusion neural network; generating a fourth denoised image representation from the combined denoised image representation utilizing the second denoising iteration of the diffusion neural network; and combining the third denoised image representation and the fourth denoised image representation to generate an additional combined denoised image representation of the first prompt and the second prompt in the second denoising iteration of the diffusion neural network.

In some implementations, the series of acts 1000 includes generating the first vector representation of the first prompt by: generating, from a text prompt and utilizing a generative model, an input image representation; and generating the first vector representation from the input image representation. Alternatively, in some implementations, the series of acts 1000 includes generating the first vector representation of the first prompt by generating a first image vector representation of a first image prompt; and generating the second vector representation of the second prompt by generating a second image vector representation of a second image prompt.

Embodiments of the present disclosure may comprise or utilize a special purpose or general purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions from a non-transitory computer-readable medium (e.g., memory) and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general purpose computer, special purpose computer, or special purpose processing device to perform a certain function or group of functions. In some embodiments, computer-executable instructions are executed by a general purpose computer to turn the general purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), a web service, Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
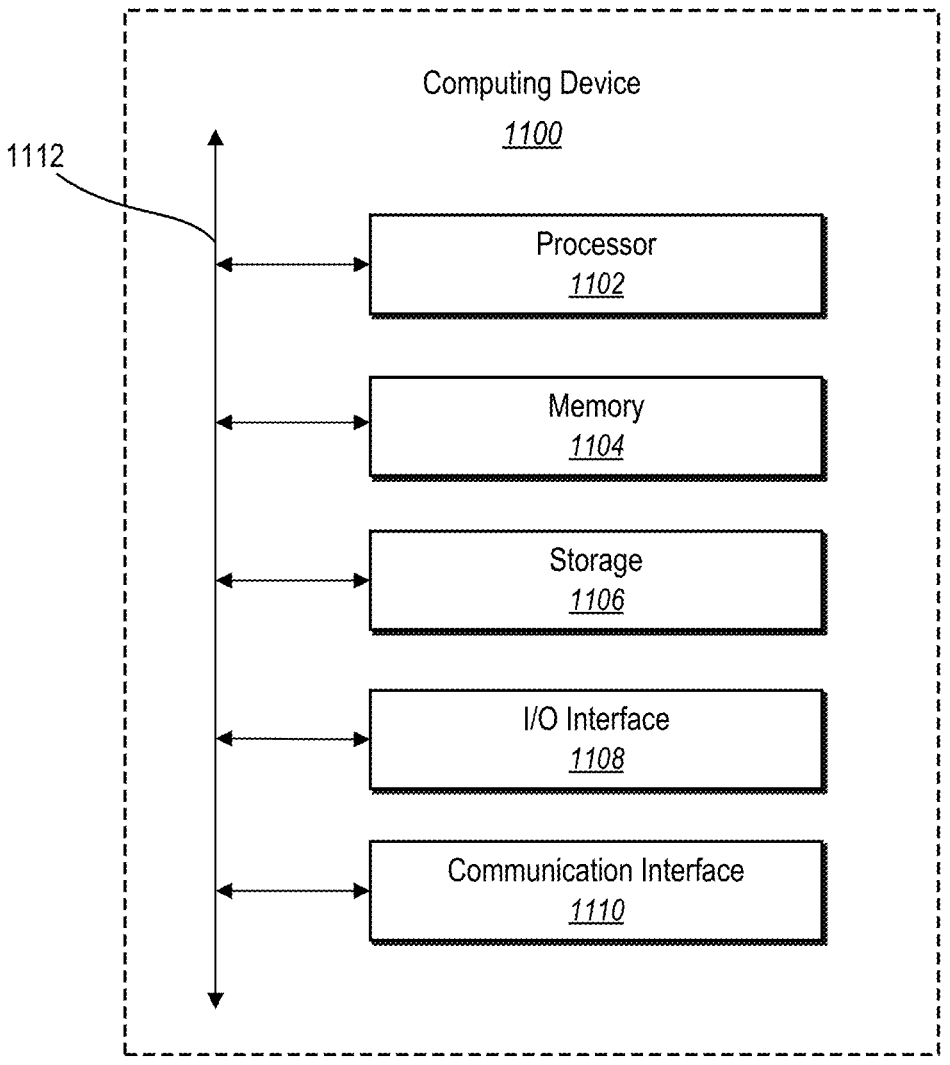
FIG. 11 illustrates a block diagram of an example computing device for implementing one or more embodiments of the present disclosure.

FIG. 11 illustrates a block diagram of an example computing device 1100 that may be configured to perform one or more of the processes described above. One will appreciate that one or more computing devices, such as the computing device 1100 may represent the computing devices described above (e.g., the computing device(s) 900, the server device(s) 106, or the client device 108). In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes the memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes the storage device 1106 for storing data or instructions. As an example, and not by way of limitation, the storage device 1106 can include a non-transitory storage medium described above. The storage device 1106 may include a hard disk drive ("HDD"), flash memory, a Universal Serial Bus ("USB") drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller ("NIC") or network adapter for communicating with an Ethernet or other wire-based network or a wireless NIC ("WNIC") or wireless adapter for communicating with a wireless network, such as a WI-FI. The computing device 1100 can further include the bus 1112. The bus 1112 can include hardware, software, or both that connects components of computing device 1100 to each other.

The use in the foregoing description and in the appended claims of the terms "first," "second," "third," etc., is not necessarily to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget, and not necessarily to connote that the second widget has two sides.

In the foregoing description, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

generating, utilizing a reverse diffusion model, an image noise representation from a first image prompt;

generating, utilizing a diffusion neural network in a first conditioning pass conditioned with a first vector representation of the first image prompt, a first denoised image representation from the image noise representation;

generating, utilizing the diffusion neural network in a second conditioning pass conditioned with a second vector representation of a second image prompt, a second denoised image representation from the image noise representation; and combining the first denoised image representation and the second denoised image representation to generate a digital image.

2. The computer-implemented method of claim 1, wherein combining the first denoised image representation and the second denoised image representation comprises assigning a first weight to the first denoised image representation and a second weight to the second denoised image representation.

3. The computer-implemented method of claim 2, further comprising:

providing, for display via a user interface of a client device, a weight control element; and determining the first weight and the second weight based on a user interaction with the weight control element.

4. The computer-implemented method of claim 2, further comprising:

combining the first denoised image representation and the second denoised image representation at a first denoising iteration of the diffusion neural network; and combining, at a second denoising iteration of the diffusion neural network, a third denoised image representation and a fourth denoised image representation by assigning a third weight to the third denoised image representation and a fourth weight to the fourth denoised image representation.

5. The computer-implemented method of claim 2, further comprising:

determining a function of weights defining a plurality of weights for combining denoised image representations across a plurality of denoising iterations of the diffusion neural network; and combining the first denoised image representation and the second denoised image representation by determining the first weight and the second weight from the function of weights.

6. The computer-implemented method of claim 1, wherein generating the image noise representation from the first image prompt comprises at least one of:

generating the image noise representation utilizing a deterministic reverse diffusion model; or generating the image noise representation utilizing a stochastic reverse diffusion model.

7. The computer-implemented method of claim 1, wherein generating the first denoised image representation and the second denoised image representation comprises:

generating, utilizing an embedding model, the first vector representation from the first image prompt; and generating, utilizing the embedding model, the second vector representation from the second image prompt.

8. The computer-implemented method of claim 7, further comprising:

combining the first denoised image representation and the second denoised image representation by generating a combined denoised image representation;

generating, utilizing the diffusion neural network conditioned with the first vector representation, a third denoised image representation from the combined denoised image representation;

generating, utilizing the diffusion neural network conditioned with the second vector representation, a fourth denoised image representation from the combined denoised image representation; and combining the third denoised image representation and the fourth denoised image representation by generating an additional combined denoised image representation.

9. The computer-implemented method of claim 1, further comprising:

combining the first denoised image representation and the second denoised image representation by generating, for a first denoising iteration of the diffusion neural network, a combined denoised image representation of the first image prompt and the second image prompt;

generating, utilizing a second denoising iteration of the diffusion neural network, a third denoised image representation from the combined denoised image representation; and generating, utilizing the second denoising iteration of the diffusion neural network, a fourth denoised image representation from the combined denoised image representation.

10. A system comprising:

one or more memory devices comprising a first prompt, a second prompt, a reverse diffusion model, and a diffusion neural network; and one or more processors configured to cause the system to:

generate, utilizing the reverse diffusion model, a noise representation of the first prompt;

generate, utilizing an embedding model, a first vector representation of the first prompt and a second vector representation of the second prompt;

generate a first denoised image representation from the noise representation of the first prompt utilizing the diffusion neural network in a first conditioning pass conditioned with the first vector representation of the first prompt;

generate a second denoised image representation from the noise representation of the first prompt utilizing the diffusion neural network in a second conditioning pass conditioned with the second vector representation of the second prompt; and combine the first denoised image representation and the second denoised image representation to generate a digital image.

11. The system of claim 10, wherein the one or more processors are further configured to cause the system to:

receive a user interaction with a weight control element via a user interface of a client device;

determine, based on the user interaction with the weight control element, a first weight for the first denoised image representation and a second weight for the second denoised image representation; and combine the first denoised image representation and the second denoised image representation according to the first weight and the second weight.

12. The system of claim 10, wherein the one or more processors are further configured to cause the system to:

generate a third denoised image representation from a combined denoised image representation of the first prompt and the second prompt, utilizing the diffusion neural network conditioned with the first vector representation of the first prompt;

generate a fourth denoised image representation from the combined denoised image representation, utilizing the diffusion neural network conditioned with the second vector representation of the second prompt; and combine the third denoised image representation and the fourth denoised image representation to generate an additional combined denoised image representation of the first prompt and the second prompt.

13. The system of claim 10, wherein the one or more processors are further configured to cause the system to:

combine the first denoised image representation and the second denoised image representation to generate a combined denoised image representation of the first prompt and the second prompt in a first denoising iteration of the diffusion neural network;

generate a third denoised image representation from the combined denoised image representation utilizing a second denoising iteration of the diffusion neural network;

generate a fourth denoised image representation from the combined denoised image representation utilizing the second denoising iteration of the diffusion neural network; and combine the third denoised image representation and the fourth denoised image representation to generate an additional combined denoised image representation of the first prompt and the second prompt in the second denoising iteration of the diffusion neural network.

14. The system of claim 10, wherein the one or more processors are configured to cause the system to generate the first vector representation of the first prompt by:

generating, from a text prompt and utilizing a generative model, an input image representation; and generating the first vector representation from the input image representation.

15. The system of claim 10, wherein the one or more processors are configured to cause the system to:

generate the first vector representation of the first prompt by generating a first image vector representation of a first image prompt; and generate the second vector representation of the second prompt by generating a second image vector representation of a second image prompt.

16. A non-transitory computer-readable medium storing executable instructions that, when executed by a processing device, cause the processing device to perform operations comprising:

generating, from a noise representation of a first prompt and utilizing a first denoising iteration of a diffusion neural network, a first denoised image representation conditioned with a first vector representation and a second denoised image representation conditioned with a second vector representation;

generating a combined denoised image representation from the first denoised image representation and the second denoised image representation;

generating, from the combined denoised image representation and utilizing a second denoising iteration of the diffusion neural network, a third denoised image representation conditioned with the first vector representation and a fourth denoised image representation conditioned with the second vector representation; and combining the third denoised image representation and the fourth denoised image representation to generate a digital image.

17. The non-transitory computer-readable medium of claim 16, wherein the operations further comprise:

determining a first weight for the first denoised image representation and a second weight for the second denoised image representation;

generating the combined denoised image representation from the first denoised image representation and the second denoised image representation according to the first weight and the second weight;

determining a third weight for the third denoised image representation and a fourth weight for the fourth denoised image representation; and combining the third denoised image representation and the fourth denoised image representation according to the third weight and the fourth weight.

18. The non-transitory computer-readable medium of claim 16, wherein the operations further comprise:

determining a function of weights defining a plurality of weights for combining denoised image representations across a plurality of denoising iterations of the diffusion neural network; and combining the third denoised image representation and the fourth denoised image representation by determining a third weight and a fourth weight from the function of weights.

19. The non-transitory computer-readable medium of claim 16, wherein the operations further comprise:

generating, utilizing an embedding model, the first vector representation from a first image prompt or a first text prompt; and generating, utilizing the embedding model, the second vector representation from a second image prompt or a second text prompt.

20. The non-transitory computer-readable medium of claim 16, wherein the operations further comprise:

generating the noise representation of the first prompt utilizing a deterministic reverse diffusion model or a stochastic reverse diffusion model.

* * * * *